US007013288B1

(12) United States Patent
Reifel et al.

(10) Patent No.: US 7,013,288 B1
(45) Date of Patent: Mar. 14, 2006

(54) METHODS AND SYSTEMS FOR MANAGING THE DISTRIBUTION OF IMAGE CAPTURE DEVICES, IMAGES, AND PRINTS

(75) Inventors: Mitchell Reifel, Costa Mesa, CA (US); Gregory Urban, Las Flores, CA (US); Ian Olsen, Newport Beach, CA (US)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 09/579,789

(22) Filed: May 26, 2000

(51) Int. Cl.
*G06F 17/60* (2006.01)

(52) U.S. Cl. .......................................... 705/26; 705/27

(58) Field of Classification Search ................ 705/26, 705/27, 40; 717/11; 358/1.15, 442; 396/429; 455/406; 380/10; 398/3.2; 709/217; 713/193
See application file for complete search history.

(56) References Cited

U.S. PATENT DOCUMENTS

| | | | |
|---|---|---|---|
| 4,722,554 A | 2/1988 | Pettit | |
| 5,085,470 A | 2/1992 | Peach et al. | |
| 5,299,835 A | 4/1994 | Sonnenberg | |
| 5,428,423 A | 6/1995 | Clark | |
| 5,760,917 A * | 6/1998 | Sheridan | ..................... 358/442 |
| 5,794,210 A * | 8/1998 | Goldhaber et al. | ........... 705/14 |
| 5,809,242 A | 9/1998 | Shaw et al. | |
| 5,823,575 A | 10/1998 | Ives | |
| 5,862,218 A * | 1/1999 | Steinberg | .................... 713/176 |
| 5,887,905 A | 3/1999 | Collins | |
| 5,924,737 A | 7/1999 | Schrupp | |
| 5,926,218 A * | 7/1999 | Smith | .................... 348/207.99 |
| 5,963,752 A * | 10/1999 | Zander | ...................... 396/429 |
| 5,974,401 A * | 10/1999 | Enomoto et al. | ............. 705/40 |

(Continued)

FOREIGN PATENT DOCUMENTS

JP 08037637 A * 2/1996

OTHER PUBLICATIONS

Photographic Trade News, "Satisfaction Yields Future Gains"; Jul. 1994.*

(Continued)

*Primary Examiner*—L. Ellis
*Assistant Examiner*—R. E. Rhode, Jr.
(74) *Attorney, Agent, or Firm*—George O. Saile; Stephen B. Ackerman; Billy Knowles

(57) ABSTRACT

The present invention is generally directed to methods and systems for distributing image capture devices, images, and prints. One embodiment of the present invention advantageously provides cameras, such as digital cameras or film cameras, to consumers for free or at a discounted cost. In exchange, the consumer makes a commitment that a certain number of image reproduction or prints will be purchased by the consumer and/or by others. In another embodiment, a user receives prints with associated advertisements attached at a reduced price.

76 Claims, 14 Drawing Sheets

U.S. PATENT DOCUMENTS

| | | | |
|---|---|---|---|
| 6,009,410 A | 12/1999 | LeMole et al. | |
| 6,017,157 A | 1/2000 | Garfinkle et al. | |
| 6,029,141 A * | 2/2000 | Bezos et al. | 705/27 |
| 6,092,841 A | 7/2000 | Best et al. | |
| 6,157,435 A | 12/2000 | Slater et al. | |
| 6,167,251 A * | 12/2000 | Segal et al. | 455/406 |
| 6,169,596 B1 * | 1/2001 | Shiota | 355/40 |
| 6,198,526 B1 | 3/2001 | Ohtsuka | |
| 6,327,439 B1 | 12/2001 | Yamada | |
| 6,360,362 B1 * | 3/2002 | Fichtner et al. | 717/168 |
| 6,369,908 B1 * | 4/2002 | Frey et al. | 358/1.15 |
| 6,573,927 B1 * | 6/2003 | Parluski et al. | 348/32 |
| 6,578,072 B1 * | 6/2003 | Watanabe et al. | 709/217 |
| 6,587,949 B1 * | 7/2003 | Steinberg | 713/193 |

OTHER PUBLICATIONS

"Special Delivery; Books were just the beginning. Now you can get everything from potato chips to bath products sent to you each month"; State Journal Register; Springfield, Ill; Dec. 12, 1999; Katheryn Rem Staff Writer.*

"Kodak Tries to Inspire More Picture-Taking In India with Rentals", by Rasul Bailay, Asia Wall Street Journal; New York; Jan. 15, 1999.*

"Kodak Tries to Inspire More Picture—Taking in India with Rentals"; Rasul Bailiay; Asian Wall Street Journal; Jan. 15, 1999.*

* cited by examiner

Please provide your account Information:

User Name [ ]
Password [ ]
Confirm Password [ ]

*FIG. 7A*

Or, to sign up for a new account please enter the following:

Name [ ]
Street Address [ ]
Address (cont.) [ ]
City [ ]
State/Province [ ]
Zip/Postal Code [ ]
Country [ ]
Work Phone [ ]
Home Phone [ ]
FAX [ ]
E-mail [ ]

BILLING

Credit Card [VISA ▽]
Cardholder Name [ ]
Card Number [ ]
Expiration Date [ ]

Primary print shipping preference

Street Address [ ]
Address (cont.) [ ]
City [ ]
State/Province [ ]
Zip/Postal Code [ ]
Country [ ]

Please select the default number of image reprints to be provided for future orders:

- 1 copy
- 2 copies
- No hard copies

Please select your default print size for future orders:

- 3" x 5"
- 4" x 6"
- 5" x 7"
- CD-ROM only
- E-mailed copies only

If you did not select the CD-ROM option above, would you like your prints to be provided on CD-ROM in addition to the prints selected above?

- Please also provide my image on CD-ROM. I understand this will add $5.00 to each order.

[ Submit Form ]   [ Reset Form ]

METHODS AND SYSTEMS FOR MANAGING THE DISTRIBUTION OF IMAGE CAPTURE DEVICES, IMAGES, AND PRINTS

BACKGROUND OF THE INVENTION

1. Field of the Invention

The present invention is generally directed to imaging devices and image reproduction and in particular to methods and systems for distributing image capture devices, images, and prints.

2. Description of Related Art

Picture taking is an integral part of modern societies. People take photographs to record family events, news events, work related images, and the like. In particular, the advent of digital cameras and scanners have forth, r sparked the use and importance o: photography, as images can now by taken without the expense of film, and photographs can be widely distributed via the Internet or e-mail.

However, using conventional methods of camera sales and distribution, where consumers are faced with a large up-front purchase price, many consumers cannot afford their desired camera, such as a high performance, feature-laden camera. Further, consumer's nee often hesitant to invest in a relatively expensive digital camera, as they fear that the camera may quickly become obsolete. Another obstacle for consumers-is the high price of prints, which may dissuade consumers from purchasing a new camera, as the cost of prints may consume funds that would otherwise be available for the purchase of a camera.

Conventional methods of camera distribution and ordering of reprints have also inadequately served photofinishers and print houses. Consumer's typically have little loyalty to a particular print house, and may simply send their prints to be developed at whichever print house has the lowest price at the moment. This makes it difficult for print houses to predict the amount of expected orders from month to month, and print houses are forced to compete by constantly adjusting print prices, with service suffering as a result.

Camera manufacturers are also ill served by conventional methods of camera distribution. Most camera manufactures are not involved in the photofinishing process, and hence are deprived from participating in the recurring profits associated with photofinishing, such as profits resulting from prints, enlargements, digital retouching, and the like.

SUMMARY OF THE INVENTION

In one embodiment, the present invention advantageously provides cameras, such as digital cameras or film cameras, to consumers for free or at a discounted cost. In exchange, in one embodiment, the consumer makes a commitment that a certain number of image reproduction or prints will be purchased by the consumer and/or by others. Thus, consumers benefit, as their initial financial outlay for a camera is reduced or eliminated. Image reproduction companies that provide prints or other image reproductions also benefit, as they can expect that a certain number of image reproductions will be ordered for each camera provided, thereby ensuring a more predictable cash flow.

In addition, in one embodiment, an image-locking feature allows images to be selectively "locked" or encrypted before being transferred from the camera. This prevents the consumer from printing full resolution hard copy versions of the images, or having unauthorized print houses make such prints, unless the images are unlocked or decrypted. However, the consumer may be allowed to view the images on a camera display, or thumbnail versions of the images on a terminal or the like. The camera provider or related entity holds the key used to unlock the images. In one embodiment, the consumer uploads the encrypted images to a server associated with the camera provider or related entity. The images may be uploaded directly from the camera, or via a terminal networked to the server. The images are then decrypted and the consumer or others may then order copies of the images, ensuring that the camera provider receives income from print orders of images taken with the camera.

One aspect of the present invention enables camera manufacturers to participate in the revenue stream associated with print orders and the like. A camera manufacturer provides a discount or other benefit to a camera distributor, which in turn distributes the cameras to consumers who contract to purchase a certain amount of prints. In exchange for the discount provided by the camera manufacturer, the camera distributor ensures that a portion of the proceeds resulting from the purchase of prints by consumers is provided to the camera manufacturer.

Yet another aspect of the present invention advantageously also provides prints of images taken with the camera for free or at a reduced cost. In exchange, the consumer agrees to have advertisements, including notices, offers or coupons, accompany the prints. Advertisers thereby also benefit, as they are ensured that there is a great likelihood that their advertisements will be read. The advertisements and coupons may be appropriately selected based on a given consumer's profile, including the consumer's demographic profile, camera usage patterns, and purchase patterns. The profile information may be provided by or collected from the consumer. All or portions of the profile information may be stored in the camera. The advertisements may be, by way of example, tear-offs attached to the print. In addition or alternatively, the advertisements may be printed over the image or in a border area around the image.

In addition, friends and family members benefit from the present invention, as using a networked terminal, they can view and/or order reproduction of pictures taken by the consumer. Optionally, the consumer may designate who is authorized to view pictures taken by the consumer. The consumer may receive credit, discounts, and/or rebates based on orders for the consumer's pictures by others.

BRIEF DESCRIPTION OF THE DRAWINGS

FIGS. 7A–B illustrate an exemplary registration form;

FIG. 8 illustrates an exemplary status and order Web page;

DETAILED DESCRIPTION OF THE INVENTION

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol).

It should be understood that the term "site" is not intended to imply a single geographic location, as a Web or other network site can, for example, include multiple linked geographically distributed computer systems. Furthermore, while the following description includes a description of an embodiment utilizing the Internet and related protocols, other networks, such as networked interactive televisions, set-top boxes, including those for digital cable and satellites, phones, kiosks, and corresponding protocols may be used as well. In the figures, words and phrases are underlined to indicate a hyperlink to a document or Web page related to the underlined word or phrase. In addition, unless otherwise indicated, the functions described herein are preferably performed by executable code running on one or more general-purpose computers or servers.

The term "camera" as used herein includes, but is not limited to, digital cameras, film-based cameras, and video cameras. A digital camera is generally a camera that captures, stores and/or transmits images digitally rather than recording them on film. Once a picture has been taken, it may be transferred from the camera to a computer system or printer via a port or via a memory card. Many, though not all, digital cameras come equipped with a flat panel display. The camera display may be used as a viewfinder, as well as to view stored images and to provide instructions to the camera operator. Typically, images taken with a digital camera may be manipulated using widely available image manipulation or photo editing programs. Optionally, digital cameras may include features such as time and date stamping of images.

The term "image reproduction" as used herein, includes, but is not limited to, hard copy prints on photographic paper, images reproduced on a computer printer, digital images stored in memory or displayed, images reproduced on clothing and/or images reproduced on other items, such as calendars or dishware.

Figure 13:
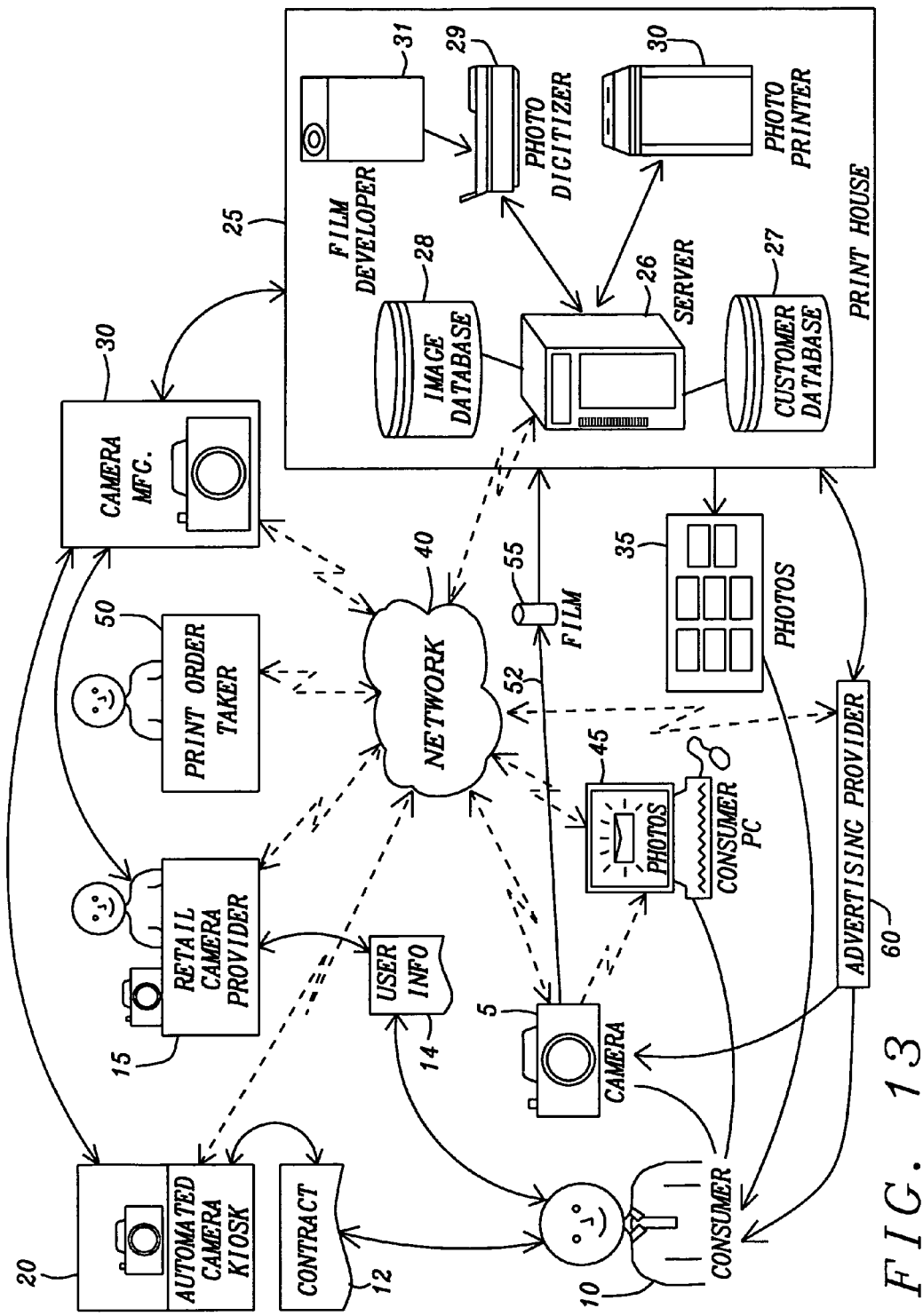
FIG. 13 illustrates a system for distributing image capture devices, images, and prints in accordance with one embodiment of the invention

The present invention relates to methods and system for distributing image capture devices, such as cameras, and images, including digital images and prints. One embodiment of the present invention (the system which is shown in FIG. 13) advantageously provides cameras 5, such as digital cameras or film cameras, to consumers 10 for free or at a reduced or discounted cost. A retail camera provider 15, a camera kiosk 20, an image print house/developer/photofinisher 25, print order taker 50, a camera manufacturer 30 or other entity (hereinafter referred to as camera provider) may provide the camera 5. The consumer 10 is in communication with the camera providers through an electronic network 40. The an electronic network 40 provides a communication channel through which one of the camera providers that is communicating with the consumer 10 offers the camera 5 free or at a reduced or discounted cost for a commitment that a certain number of image reproduction or prints 35 are to be purchased by the consumer 10 and/or by others associated with the consumer 10.

The contract may be generated as a face to face encounter between the consumer 10 and the retail camera provider 15. The contract may generated as a be a toll free telephone conversation between the consumer 10 and a fulfillment house or telecommunications operator that is under the auspices of the retail camera provider 15, the print order taker, 50, the camera manufacturer or the print house 25. The conversation may be over an electronic network 40 such as a global digital communication system (internet). The contract could result from a form filled out in a kiosk made available by the camera provider. Additionally, the contract could be generated through a catalog or a direct mailing. These are examples of some of the ways that one could generate the contract between the consumer 10 and the camera provider.

The consumer 10 makes a commitment to purchase a certain number of image reproduction or prints 35 for which the camera provider commits to the give the camera 5 for free or to sell of the camera 5 reduced or at a discounted cost. A contract 12 is created and the camera is transferred from the camera provider to the consumer 10 through the contractual interface 13. The contract 12 may define the period during which the reprints must be purchased and allow persons associated with the consumer eg. friends or family 10 to also purchase reprints and receive credit under the commitment.

Thus, consumers 10 benefit, as their initial financial outlay for a camera 5 is reduced or eliminated. In addition, as will be described in detail below, friends and family members benefit, as they can view and/or order reproduction of pictures 35 taken by the consumer 5 using a networked 40 terminal. Image reproduction companies 25 that provide prints 35 or other image reproductions also benefit, as they can expect that a certain number of image reproductions will ordered for each camera 5 provided, thereby ensuring a more predictable cash flow.

In one embodiment, a consumer 10 is provided with a digital camera 5 at a discounted price in exchange for a commitment to purchase a certain number of prints 35 or otherwise spend a certain amount of money with the camera provider, where the discount may range up to 100% of the camera price, so that the camera is "free." The contract 12 between the consumer 10 and the camera provider may include a commitment to purchase the prints over a predetermined amount of time. The discount may be increased in exchange for a commitment 12 to buy an increased number of prints 35. Thus, for example, if a large enough commitment is made, the camera 5 may be given to the consumer 10 with no up-front payment.

In addition, the consumer may be offered different levels of cameras 5 corresponding to different levels of commitments 12. Thus, for example, if the consumer 10 agrees to buy a small number of prints 35, the consumer 10 is provided with a "low-end" camera 5, such as a digital camera with less than 1 million pixels. If the consumer agrees to buy a greater number of prints, the consumer may be offered a camera with a higher level of performance, having, for example, greater than 1 million pixels.

By way of example, in exchange for receiving a digital camera having 950,000 pixels for a payment of $50, the consumer may commit to purchase 600 prints of a selected size, for example 3"×5", over a period of 2 years. The cost of the prints of the selected size may be fixed over the period of the commitment. For example, the cost of each 3"×5" print may be fixed at 30¢ a print for the first 600 prints ordered over the 2 year commitment period. If the consumer agrees to purchase 900 prints within 2 years, the consumer may be offered the same camera for $25 and/or the option of a digital camera having 1.8 million pixels for $50. In addition, the consumer may be offered discounts on the cost of the prints if the consumer commits to a greater number of prints, or if the consumer's purchases exceeds the committed to amount.

If the consumer 35 orders more expensive reproductions of an image, the consumer 10 may receive more credit towards the consumer's commitment then if the consumer ordered the least or less expensive reproduction 35 of the image. When visiting a Web site associated with the print house 25, the consumer 10 may be presented with a menu of available products on which images can be imprinted, and the associated credit toward the consumer's commitment 12.

Thus, if the consumer orders larger size prints, which typically cost more, the consumer may be provided with more than one credit for each larger print. For example, each order of a 5"×7" print, at 45¢ a print, may count as 1.5 prints toward the commitment to order 600 prints. If the consumer orders a cup costing 57.00 imprinted with a copy of an image, the order may count as 10 prints towards the commitment to order 600 prints.

In one embodiment, the consumer can specify which print house or vendor 25 should be used to provide the prints 35. Optionally, the print house 25 selection may be restricted to those listed by the camera provider and defined within the contract 12 between the consumer 10 and the camera provider. A discount for prints may be offered when the consumer 10 selects certain designated or eligible print houses 25. In one embodiment, the consumer 10 may elect, by activating an appropriate Web page link or the like in communication with a consumer's personal computer 45 through the network 40, to have the print order taker 50 select the print house 25 which will result in the lowest cost per print. Further, for an additional fee, the consumer 10 may optionally select a print house 25 not listed by the camera provider 15. The additional fee may be a flat fee for an entire order and/or a fee per print ordered.

The consumer 10 may view his or her account information by accessing such information from the print house's, camera provider's, and/or related entity's Web site from the consumers personal computer 45. As will be discussed later in greater detail, in one embodiment the account information may be presented on the camera viewfinder, as well as on a personal computer display. The account information may include the number and type of reproductions previously ordered, the date and cost of the orders, the number of reproductions that the consumer needs to order to fulfill the consumer's commitment, and the date, if any, by which the commitment is to be fulfilled. If the consumer fails to meet the commitment by the designated date, the consumer may be billed or charged for all or a portion of the actual retail or wholesale cost of the camera or may be charged a fixed termination fee. The amount of the charge may be specified in the commitment agreement entered into by the consumer.

In one embodiment, a portion or percentage of the cost of reproduction purchases made by the consumer 10 may be used to offset the amount charged for failure to meet his or her commitment. Thus, for example, if at the end of the commitment period the consumer has only ordered 300 prints, rather than the committed to 600 prints, 10% of the value of the ordered 300 prints may be used to reduce the amount charged to the consumer 10 for the cost of the camera 5.

Once the cost of the camera 5 has been recovered, the print house 25 or camera provider 15 may optionally then enable camera to be freely used via a downloaded activation code or key, with no restriction on the viewing or reproduction of images taken using the camera. However, in one embodiment, the camera is not so enabled, making the camera relatively useless, thereby further providing an incentive to the consumer 10 to meet his or her commitment 12. Instead, the consumer 10 may "recharge" the camera by agreeing to a new commitment 12, which may include a different number of committed to orders than the original commitment. In the recharge process, the consumer connects the camera, directly 7 or indirectly 9, to the appropriate server and downloads a new activation code. In addition, the consumer may be offered a new camera in exchange for a new commitment.

If the provided camera 5 is a digital camera, the consumer 10 may upload the digital images to a server 26 or other system associated with an order taker 50, the camera provider 15 and/or related print house/image reproducer 25. Of course, the camera provider 15 and print house 25 may be the same entity. To simplify the following discussion, it will be assumed that the images are uploaded to the server 26 of the print house 25. The images may be uploaded by first transferring images from the camera 5 to a computer 45, and from the computer 45 to server 26 of the print house 25 via a network 40 such as the Internet or the like. In one embodiment, images may be directly transferred from the camera 5 to the server 26 of the print house 25 if the camera 5 is network-able via a built-in wired or wireless modem or other interface, such as a serial port, a USB port, or a wireless interface, such as a Bluetooth or a wireless DSL interface, via a coupled cellular phone or via a removable memory module used to store images. The consumer may then view the images on a terminal, such a computer or PDA, connected to the print house site and may order prints 35 or other reproductions of the desired images. Upon uploading the digital images to the server 26, the images are retained in the image database 28.

If the provided camera 5 is a standard film camera, the consumer 10 may transfer 52 the exposed film 55 to the print house 25. The print house submits the exposed film 55 to a film developer 31 for processing and from the film developer 31 to a photo digitizer 29. The processed photos may be directly printed by the photo printer 30 by conventional means to provide the photo reproductions 35 as ordered by the consumer 10. Alternately, the digitized photo files are retained by the image database 28 for future reproduction and for transfer of low resolution images to the consumer 10 for evaluation, selection, and ordering. It is apparent that the film 55 maybe transferred from the consumer 10 through the camera kiosk 20, the camera provider 15, or the print order taker 50 to the print house 25 for processing.

Each image may optionally have one or more of the following items of information associated with the image:
1. Date/time/location the picture was taken.
2. ISO equivalency, Aperture settings, Shutter speed.
3. User editable data: rating, classification, image title.
4. Multimedia enhancement: video clip, audio clip.

The date, time, and location information may be later printed in association with the image, such as on the front or back of a print 35 of the image, to help the consumer recall when and where the picture was taken. A built in calendar and clock, provided in many cameras, may automatically provide the date and time. In one embodiment, location information may be entered using a hard or "soft" keyboard or data entry device, where the soft keyboard may be a touch sensitive screen on which a keyboard is displayed, located or attached to the camera. The information can also be later added to the images after the images are transferred to a computer. In addition, a user may similarly add picture titles, age suitability ratings, and classification information (such as vacation, work, etc.), as well as video and/or audio clips.

The ISO equivalency, aperture settings, and shutter speed used to take a given picture may also be associated with the corresponding picture, so that prints, including color balancing and the like, of the picture may be optimized based on this information.

Optionally, others may view and order prints 35 of the images as well, for example, by visiting a Web site to which the images are posted. The viewing and ordering images may be restricted by requiring, by way of example, the entry of a password or other code. Consumers may designate some images as private, and thus not viewable or orderable without the consumer's access code. Other images may be designated as shared, where users having another code, termed a "shared" code, can view and order the shared images. Still other images may be designated as public, so that anyone accessing the Web site to which the images are posted can view and order the images.

Thus, for example, a consumer can provide the appropriate shared code to relatives so that the relatives may view and order shared images of the consumer's family. Optionally, the consumer may receive credit towards the consumer's commitment for prints ordered by others, advantageously making it easier and less expensive for the consumer to meet the commitment, while allowing family to efficiently order reproductions. Similarly, the consumer may obtain credit for purchases made of the consumer's images designated as "public." This provides incentives for the consumer to post images that are likely to be popular. In one embodiment, the consumer may be granted a commission, rebate, or a discount on future orders if the number of prints ordered by the consumer and/or the number of prints of the consumer's images ordered by others exceeds the consumer's committed to number.

The consumer may also individually rate the images as suitable for the general population, suitable for those over the age of 16, or as images suitable for adults. Viewers visiting the Web site to which the images are posted may first be asked to select a rating level, wherein the viewer will not be presented with images having a more mature rating then the selected rating level, or will only be presented with images with the selected rating level.

In one embodiment, certain measures may be taken to ensure that some or all of the reproductions of images made with the provided camera are purchased from the camera provider or a print house associated with the camera provider. For example, if the provided camera is a digital camera, viewing of images taken with the camera may be restricted so that the images may only be viewed using the camera's built-in viewfinder display. The images may be secured or "locked," via encryption or scrambling by the camera's internal processor, before being transmitted out of the camera's port or stored in a removable memory module, so that the images may not be viewed on another display unless the images are de-scrambled or decrypted by the print house 25, camera provider 15 and/or order taker 50. Standard encryption techniques, such as public key encryption, wherein the camera encrypts images using a public key that can only be decrypted using a private key in the possession of the print house 25 or order taker 50, may be used.

In another embodiment, the camera 5 may be inhibited from transmitting images altogether until an appropriate code is downloaded to the camera via a camera port by the print house 25 or a related entity. The code may be downloaded, by way of example, over the Internet 40 via a computer system 45.

In one embodiment, rather than completely preventing a consumer 10 from viewing or printing images on a display external to the camera, the consumer 10 may be allowed to view and/or print thumbnails of images taken with the camera 5 on a terminal, computer 40, television, or the like. A thumbnail is a miniature display of an image. Several thumbnails may optionally be viewed together on a display, Generally, thumbnails are of fairly low resolution, for example 352×288 pixels (CIF format), or 88×72 pixels (QCIF format), which is satisfactory for the purpose of deciding which images are to be printed or ordered, and yet ordinarily would not provide a satisfactory printed version of the image. The consumer 10 or others may use the thumbnail images to select images for which reproductions 35 are to be ordered. In one embodiment, the consumer 10 may e-mail the thumbnails to others or post the thumbnail images on a Web site. The thumbnail images are associated with a link to the print house's 25 Web site, such that, for example, when a recipient of an e-mailed image clicks on the image, a browser or the like is launched, and the recipient is presented with an order form which may be used to order reproductions of the image.

In addition to the increased sales of image prints or reproductions, the embedded link puts the print house 25, order taker 50, and/or camera provider 15 in contact with likely potential customers who are interested in photography and are comfortable with conducting transactions over the Internet. The recipient may be offered a free or discounted camera in exchange for a commitment similar to that discussed above. The offer may be presented on the linked Web site, via e-mail, by mail or using other conventional techniques. The recipient may provide the corresponding email address and/or physical address during the purchase process. In one embodiment, consumers 10 whose e-mails or images result in new commitments by new customers may be provided with a bonus in the form of, by way of example, a reduction in the committed number of prints they must purchase, free prints, and/or discounts on future image reproductions or other items from those committed to in the contract 12.

Optionally, once a print 35 of an image has been purchased, the image may then be "unlocked" or decrypted by the print house and optionally be viewed with full resolution. The decryption key may be downloaded from a server 26 associated with the print house 25 or may be e-mailed to the consumer 10. The full resolution image, as well as the thumbnail image, may be stored on a server 26 associated with the print house 25 or on the consumer's computer 40. Thus, a consumer 10 may be allowed to, for example, print out additional copies of an image using the consumer's printer once a reproduction of that print has been purchased from the print house. In addition, the print house 25 may optionally elect to allow the consumer 10 to freely view and print images once the consumer has fulfilled her or his commitment 12, and ordered the requisite number of prints 35.

To further ensure that the consumer meets his or her commitment as defined in the contract 12 to order a certain number of reproductions, the consumer may be required to provide a credit card and/or to provide authorization to charge the credit card or other financial instrument associated with the consumer a selected amount should the consumer fail to fulfill the commitment, before providing the camera 5. Alternatively, the consumer may optionally prepay the cost of the committed to reproductions. Thus, for example, if the consumer has agreed to purchase 500 prints within a year at a cost of 30¢ a print, the consumer can prepay $150, and so does not have to be concerned about meeting any order commitments 12.

While the above examples assume that the free or discounted cameras 5 are provided directly to end-user consumers, in another embodiment, the cameras 5 are provided to intermediaries or businesses 15 or 20, who in turn supply the cameras to end users. For example, an intermediary 15 or 20 may acquire a large quantity of cameras 5 from the print house 25 in exchange for committing that a certain number of prints 35 will be ordered. The intermediary 15 or 20 may be offered a portion of the sales of the printed ordered for images or a portions of the sales of prints over and above the committed to quantity. The intermediary then provides end-users with the cameras at a certain cost or for free. The intermediary 15 or 20 may require that the end-users agree to order a certain number of prints in exchange for receiving a discount on the camera 10. The number of cameras provided to end-users multiplied by the committed number of prints to be ordered may exceed the quantity of prints that the intermediary committed to. Thus, the intermediary 15 or 20 is advantageously responsible for distributing cameras 5 to end users in exchange for a share of the sales.

Further, in one embodiment, rather than having the end users order reproductions 35 directly from the print house 25, the end users place the orders with the intermediary 15 or 20 that in turn places the order to the print house 25. This allows the intermediary 15 or 20 to accurately track the number of reproductions 35 being ordered while freeing the print house 25 from managing the order taking process.

In another embodiment, the camera manufacturer 30 may provide cameras to the print house 25 or other intermediary 15 or 20 at a discount. In exchange, for a percentage or selected amount for each print 35 ordered by the end-users or for other consideration resulting from or related to the purchase of prints 35 of images taken with the camera 5, such as enlargements, photo albums, retouching of images, or the like. Thus, the camera manufacturer 30 can advantageously share both the potential profits as well as the risks associated with the revenue generation derived from image reproduction. Because of the discount provided by the camera manufacturer 30, the intermediary 15 or 20 can provide the cameras to consumers at a lower cost.

In addition, to help subsidize the cost of the camera 5 and/or prints 35 to consumers 10 and to increase the income to the image reproduction companies 25, camera provider 15, and/or other related entities 20, advertising supplied by an advertising provider 60, such as promotional offers or discount coupons, may be provided with prints 35 or other forms of image reproduction delivered to consumers 10. The advertising provider 60 is in communication with the consumer database 27 to determine appropriate advertisements to be delivered to the consumer 10. The advertising may be printed on the image reproduction, such as on the front or back of prints or on a border around the image reproduction, or may be otherwise associated or attached on the image reproduction. For example, in one embodiment, an advertisement or coupon may be provided as a tear-off or otherwise separable attachment to a hard copy print 35. If the image reproduction is printed on an item of clothing, such as a tee shirt, or on a cup, a corresponding advertisement may likewise be printed or, the clothing or cup. For electronic images viewable on a networked display, the advertisements or coupons may include a link to the Web site of the sponsor of the advertisement or coupon. The advertisement may be animated to further call viewers' attention to the advertisement.

Advertisements may also be downloaded to the camera 5 when the camera is linked to the appropriate Web site, such as the order placement Web site. This allows advertisements to be displayed and updated on the camera 5 flat panel viewfinder or on images printed out via a printer coupled to the camera or via a computer to which the images were transferred.

Thus, for example, a consumer 10 or other user may be provided free or discounted prints if they agree to receive such advertising or coupons. Optionally, the consumer 10 may be charged shipping and handling fees in addition to the charge, if any, for the prints 35. In one embodiment, a user may elect to have all prints 35 provided with advertising or coupons in exchange for a corresponding discount, where the discount may range up to 100%, or may instead select which reproductions may have associated advertising and which will not. Optionally, multiple advertisements may be provided on or attached to a print 35. The consumer's 10 and/or other user's discount may vary in accordance with how many advertisements they agree to have attached to or otherwise accompany the print 35. In addition, for advertisements printed overlaying the image, the image discount may vary in accordance with the advertisement size, such as a font size, which the consumer 10 may agree to. Thus, the larger the advertisement emblazoned on a print, the larger the discount.

In one embodiment, advertisements or electronic coupons may be downloaded to a camera 10 when the camera 10 is connected to the Internet 40 or to a computer 45 connected to the Internet 40. The advertisements may be displayed on a camera display, such as an LCD viewfinder, and/or may be attached, emblazoned, or otherwise embedded in images as they are transferred from the camera 5 to other systems. In this manner, when the images are later viewed or reproduced, the advertisements or coupons will likewise be viewed or reproduced. Thus, the advertisements or coupons may be widely distributed to recipients of copies of the image, through hard copies of the image, via e-mailed copies of the image, via copies of the image posted on Web sites, or otherwise electronically transmitted copies of the image.

In one embodiment, rather than selling the camera 5, the camera 5 may be leased to a customer 10. Optionally, the camera 5 may be leased for a limited term, such as 3 or 6 months. At the end of the lease, the customer 10 may be required to return the camera 5 or may be allowed to buy the camera 5 for a fee, Such lease arrangements may be particularly attractive to consumers 10 who need a camera 5 for a limited period, such as for a 3 month summer vacation, or who may want to quickly upgrade to a better or newer camera.

The lease may include a limited number of free reprints 35 over the term of the lease, or on a per month basis. By way of example, the camera 5 may be leased for $150 for a period of 6 months, with 30 free prints a month. By including a limited number of reprints, such-as paper reprints, in the lease, the customer will be encouraged to use the camera every month. This makes it more likely that the customer will either exceed the number of prints included in the lease, or will buy ancillary products, such as cups, calendars, tee shirts and the like, with images printed thereon, thus generating additional revenues. In addition, the consumer may be provided with a guaranteed price schedule for non-free prints for the term of the lease. For example, the customer may be guaranteed that the cost of each 4"×6" print ordered in excess of the free prints will be $20 or less.

Optionally, the customer 5 may be allowed to keep the camera 5 at the end of the lease for free or for a discounted price, such as 75% of the original wholesale price, if the customer 10 purchased a certain number of prints 35 or spent a certain amount of money purchasing items from the camera lessor or intermediary during the lease. Further, the customer 10 may be offered a lease renewal at the end of the lease.

Another form of camera distribution may be via an automated or human-staffed kiosk 20. In the case of an automated kiosk 20, in one embodiment the cameras 5 are stored in locked compartments. Once a user initiates a rental, for example, by swiping a credit card into an appropriate reader and agreeing, via an interactive terminal, to certain contract terms 12, a compartment door opens and the user 10 can retrieve the camera 5 stored within. The rental fee may be a fixed amount charged for a predetermined rental period, or may be a daily rate which accrues with each day of rental.

The rental fee may be applied to prints 35 ordered by the user via the kiosk 20 or via a print house 25 or related entity such as the order taker 50 associated with the kiosk 20. For example, the user may pay a fee of S$10 using a credit card, a debit card, or other financial instrument, to rent the camera for a day. However, some or all of the $10 fee may be advantageously applied towards the ordering of prints 35.

The images taken with the rented camera 5 may be transferred to the kiosk 20 or other site via a wired or wireless network or via a peripheral bus. For example, when the consumer 10 returns the camera 5, the consumer 10 may mate a camera I/O port connector with a corresponding connector located at the kiosk 20. The kiosk connector may in turn be coupled to a network 40 or bus linked to a local or remote image storage system 28. The consumer 10 may then initiate the transfer of images via the I/O port to the image storage system 28. These images may then be printed by a photographic printer 30 as directed by the consumer. However, if the user 10 fails to return the camera 5 within a certain amount of time, the total cost of the camera 5 may be charged to the user's 10 credit card or other financial instrument. If the consumer 10 subsequently returns the camera 5, the consumer 10 may receive all or part of the charged amount back. The consumer 10 may be charged a late fee, such as a daily late fee, for late returns.

When the consumer 10 is in electronic communication with one of the camera providers through the electronic network 40 for the offering of the camera 5 and the commitment of the consumer 10 for the purchase of the requisite number of image reproduction or prints 35 to create the contract 12, the consumer 10 creates provides certain user information 14 that establishes a user profile. During the sign up process and throughout the use of the camera 5 when the camera 5 is connected to communicate with the electronic network 40 and when orders of reproductions by the consumer 10, a consumer profile is built up and transferred to a customer database 27 that is connected to the electronic network 40. The user information 14 that is used to create the consumer profile as retained by the customer database 27 advantageously may include one or more of the following:

1. Name.
2. Customer identification code.
3. Mailing Address.
4. Billing Address.
5. E-mail address.
6. Other contact information (phone numbers, fax numbers, etc.).
7. Billing information, including credit card information.
8. Preferred printing portal vendors or photofinisher.
9. Reprint/enlargement size preference.
10. Reprint/enlargement size preference finish (glossy, matte, etc.) preference.
11. Camera brand, type, and specifications.
12. Internet service type and connection speed.
13. Contract data: picture development and reproduction counters, number of prints remaining to meet contract commitment.
14. Security settings, unlocking keys, activation code.
15. Usage pattern information.

This consumer profile data may be used to provide more efficient service, with better accuracy, and to more fully meet consumers' expectations. Thus, the profile data includes conventional information, such as contact information and billing information, as well as information on the preferred or default sizes and finishes for prints, and the preferred printing or photofinisher vendor. Thus, when the consumer uploads images and/or places an order, the consumers preferences will be used as defaults, subject to changes by the consumer, saving the consumer the time and trouble of reentering the data.

In addition, information about the provided camera 5 is stored in the customer database 27 as well. The camera-related information includes the camera brand, type (film, digital, video), and specifications (number of pixels, zoom, and/or aperture information). The information may be used to ensure the proper processing of images from the camera is performed. For example, it may be known the cameras from a certain manufacturer tend to deemphasize a certain color. Knowing the brand of the camera that took the image allows the print house to compensate for brand-specific performance idiosyncrasies.

Further, if the camera's manufacturer 30 or other entities provide updated software that enhances the operation of the camera, the information may be used to determine that the updated code is applicable to the consumer's camera. The consumer may either be informed of the availability of the updated code via e-mail or a Web page notification, or the updated code may be automatically downloaded to the consumer's camera 5 the next time the camera 5 is linked, directly or via computer 45, to the camera provider 15 or print house 25 Web site.

Additionally, contract data as generated for the contract 12, including picture development and reproduction counters used to track reproduction purchases from the consumer 10 as well from others purchasing reprints of the images from the customer, is stored within the customer database 27 as part of the profile and updated as needed. The number of prints remaining to meet the contract commitment is further tracked and updated as purchases of reproductions are made. Security settings, unlocking keys or codes, and camera activation codes are stored as well. Usage pattern information, which track camera usage information and print order patterns, may be included in the profile as well. The content and use of such usage pattern information is discussed in greater detail below.

All or selected portions of the profile information may be stored on the print house 25, order taker 50, and/or camera provider 15 server. Additionally, all or portions of the profile information may be downloaded to the consumer's camera 5 and stored in nonvolatile memory when the camera 5 is linked to the corresponding server 26, either directly, or via a computer. Thus, in one embodiment, whenever and from wherever the consumer logs into the server 26 to upload images, the relevant profile information will accompany the images, without requiring the consumer 10 to reenter the information. This offers an advantage as compared to storing the information solely on the consumer's computer 45, as that computer 45 may not be used for all transfers or orders of images or reproductions 35, or the computer 45 may be used with several cameras. Thus, by way of example, the customer identification code, and camera-related information may be stored in the camera's memory, while personal information, such as addresses and contact information may not be stored in the camera 5.

The camera usage information as stored in the customer database 27 discussed above may include one or more of the following:

1. average number of pictures captured before upload of pictures.
2. average number of pictures captured vs. number of pictures printed.
3. time of day or year when camera is most likely to be used (mornings, summer, etc.) and frequency of flash usage.
4. amount of time spent viewing each image on the LCD viewfinder.
5. amount of time spent editing each image on-camera.
6. number of images captured over a given time period.
7. typical or average preferences for print numbers, sizes, or other products ordered (calendars, t-shirts, etc.).
8. track which advertisements/promotions the user investigated or generated a "click-through" experience.
9. track how many different locations to which the user had prints shipped.
10. track the user classification of their photo gallery (nature, family, friends, vacation, famous places, etc.).

This usage pattern data as stored in the customer database 27 can then be used to market new ads and promotions, such as for printing and merchandise offers, more directly and with better focus to the individual user. Further, the most optimal times for showing ads on the camera's LCD viewfinder or other display can be better determined. In addition, inferences can be made about their future camera preferences and camera performance can be improved based on the usage information.

Thus, camera performance, user services, and advertisements may be enhanced and better tuned based on the usage data. In addition, much of the camera usage information is very useful to camera manufactures, and so such information may be sold to them. Optionally, a user may be allowed to opt out of having the usage information collected and/or distributed to others, to thereby increase the user's privacy. However, if the user does opt out, the user may be deprived from receiving certain discounts, offers, and/or advertisements, as there may not be adequate user information to select and provide such discounts, offers, and/or advertisements.

For example, by knowing the camera's memory capacity and by examining the number of pictures captured before the pictures are uploaded from the camera, a determination is made as to whether the user typically waits until the memory is full before uploading. If the memory is regularly full or almost full before such an upload, then the user may benefit from increased memory capacity so as to reduce the need to upload so frequently. Thus, offers for memory upgrades or cards may be provided to the user, thereby increasing revenues and user satisfaction.

Further, by knowing the average number of pictures captured vs. number of pictures printed, a determination is made as to whether the user is only ordering prints for a small percentage, say 20%, of the captured images. If so, the consumer may be offered for reduced rates if the consumer orders additional prints, to encourage increased print orders of images.

By examining the time of day and date images are taken, a great deal of useful information may derived and used to improve camera performance and consumer satisfaction. For example, if it is determined that the user takes more images during the day than at night, advertisements for appropriate filters and polarizes may be provided to the consumer.

Furthermore, if it is determined from information obtained from a number consumers' cameras that most consumers take a majority of their pictures during the night, that information may be used by camera manufactures in deciding to optimize the camera sensors for sensitivity. If instead daytime pictures predominate, then camera manufactures may decide to optimize the camera sensors for dynamic range. In addition, by examining how many photos are taken at night, camera manufactures can better predict the lifetime of camera flash units, and decide whether they need to be improved or can be made less durable Further, camera life, which is significantly affected by flash usage, can be better predicted, and more accurate low battery warnings can be provided to the user. The frequency with which flash pictures are taken may be used to better predict needed flash cycle times, and to better specify battery-type to satisfy the predicted cycle time.

By examining the quantity of pictures taken versus the dates the pictures are taken, still more significant information can be inferred. For example, "a large number of pictures were taken during "spring break," that is, when schools typically go on vacation during the sprint, it can be inferred the user took those pictures while on travel. Special offers for enlargements or prints may be offered in larger number during this period, to further encourage the purchase of those special vacation photographs.

In addition, by knowing how much memory the camera was shipped with, optionally tracking the number and size of removable memory units the user has purchased or employed, and by examining how many pictures the user typically takes during a given period, such as a week, warning can be provided to the user via a camera display, information the user that within a predicted number of days the camera memory will be full. For example, the warning may state: "Based on your typical usage, the available memory will be full in 3 days. You may want to consider deleting or transferring one or more images." The user may use this information to either transfer or delete images from the camera after receiving the warning, or may decide to take along extra camera memory units or cards.

By examining the amount of time the camera flat panel or LCD display is used to view or edit images, and the number of pictures taken over a given period, battery life can be better predicted, and the camera power management can be optimized for such use. For example, the camera may be set to automatically shut off or go into a low power standby mode sooner if the display is left on frequently to better conserve battery power. In addition, the desirability of improved displays on the part of users can be better evaluated.

In addition, by examining the number of prints taken over a certain period, the users typical preferences for print numbers, sizes, or other products ordered, and tracking which advertisements/promotions the user investigated, additional related promotional offer and discounts may be provided. For example, if it has been determined that the consumer has taken few pictures or has not used the camera for a certain period of time, or has not uploaded images to the corresponding Web sites, advertisements may be presented via the camera display, e-mail, o: r on a Web page offering discounts if the user orders prints within a certain period of time. For example, if the user has not uploaded any images or ordered any prints for 4 weeks, an e-mail may be sent to the user stating "We miss you. Please order 10 prints for free! Additional prints are only 15¢ a print." The camera 5 can also be a "reminding" device to occasionally inform the user 10 how many prints 35 they need to fulfill, and the time remaining on their contract 12. These reminders can be provided at opportune moments selected based at least in part on the tracking data.

One embodiment of the image and camera management and distribution system will now be described in greater detail with reference to FIGS. 1–12. Throughout the following description, reference will be made to various implementation-specific details, including, for example, specific process flows, system architectures, protocol standards, forms, displays, interfaces, and the like. These details are provided in order to fully set forth preferred embodiments of the invention, and not to limit the scope of the invention. The scope of the invention is set forth in the appended claims.

Figure 1:
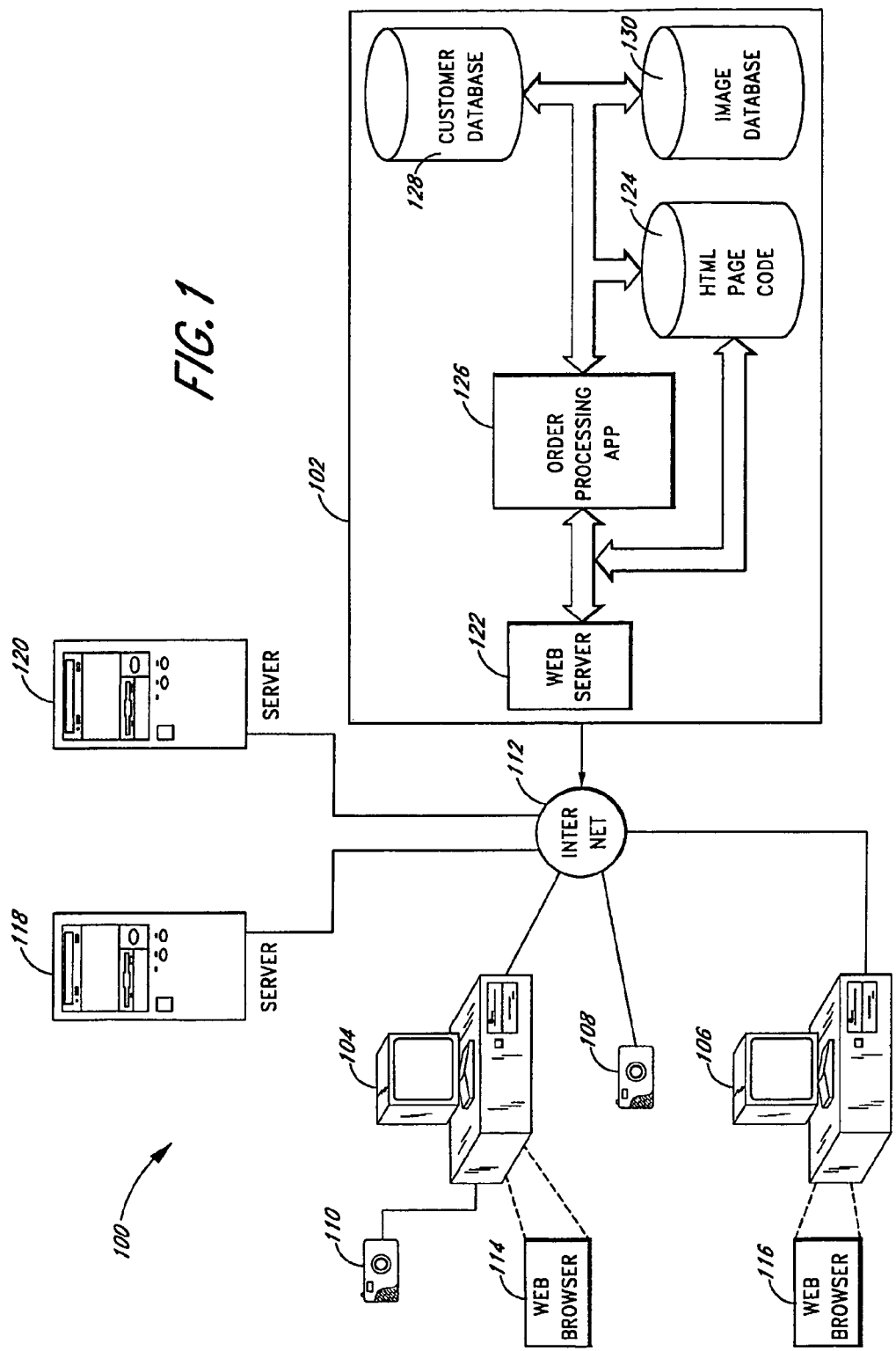
FIG. 1 illustrates an exemplary distribution system, including Web components, for implementing a system for distributing image capture devices, images, and prints in accordance with one embodiment of the invention, and illustrates typical user components for accessing the system.

FIG. 1 illustrates an exemplary image distribution and management system, including the basic hardware and software/Web components, for implementing a system for distributing image capture devices, images, and prints in accordance with one embodiment of the invention, and illustrates typical user components for accessing the system. By way of example, the exemplary image distribution and management system may be used with the methods and processes discussed below.

Customers access a Web site 102 to which images may be uploaded and from which reproductions of images may be ordered using respective computers 104, 106 or a camera 108 that has access to the Internet 112 via an internal wired or wireless modem, by way of example. The computer 110 may receive digital images from a digital camera 110 or via scanned in images. The camera provider, order taker and/or a print house may operate the Web site 102, which may be one and the same entity. The customer computers 104; 106 may run commercially-available Web browser applications 114, 116 such as Microsoft Internet Explorer® or Netscape Navigator©, which implement the basic World Wide Web standards such as HTTP and HTML. Optionally, the browsers may have the ability to run Java applets and/or ActiveX code.

In addition, the Web site 102 may be connected via the Internet 112 or other network to servers 118, 120 associated with different print houses or other image reproduction entities.

The computers 104, 106 may also run a commercially available e-mail applications, such as Microsoft Outlook©, Outlook Express® or Netscape Navigator®, which may be used to send and receive communications and images from or to the Web site 102 or others, such as print houses, friends, and the like.

In the embodiment described herein, the Web site 102 includes a computer system and associated content that are accessible via the Internet 112. The Web site 102 may optionally include content that spans multiple Internet domains, and/or may be implemented using physical servers that are geographically remote from one another. In other embodiments, the Web site 102 may be in the form of an Intranet site, and the computers 104, 106 and camera 108 may be coupled to the site by a private network. For example, Web site 102 may be in the form of an internal corporate or university store site for company or university employees.

In other embodiments, the Web site 102 may be replaced with another type of network site. For example, the various services described herein could alternatively be implemented on a hyper textual site or browsing area of an online services network such as America Online® or MSN®, or using interactive TV, in which case users may access the site using software that implements non-standard document formats and transfer protocols.

As further depicted by FIG. 1, the Web site 102 includes a commercially available Web server application 122. The Web server application 122 accesses an HTML page code database 124 used to generate Web pages in response to the actions of end users.

The Web site 102 also includes an order processing application 126 which includes the basic functionality for receiving orders from customers and for optionally selecting and relaying all or portions of orders to an appropriate print house server 118, 120. The order processing application 136 accesses a customer database 128 and an image database. The customer database 128 stores customer profile information, including, for example, contact information, billing information, print preferences, camera model, Internet service information, security codes, usage information, contract commitments, and so on. In addition, the customer database stores order history information, including the dates, types, and amounts associated with orders from the customer. The customer database 128 also includes order history information for orders of a given customer's images placed by others, such as by relatives. Counters which track how many total image reproductions have been ordered and how many still need to be ordered for a given customer to fulfill the customer's contractual requirements.

An image database 130 is used to store digital images uploaded by customers. If the uploaded images are encrypted, the images may optionally be decrypted before being stored in the image database 130. In addition, the images may optionally undergo compression before being stored, so as to reduce memory requirements. As will be discussed in greater detail below, the stored images may be viewed and reproductions of the images may be ordered.

Figure 2:
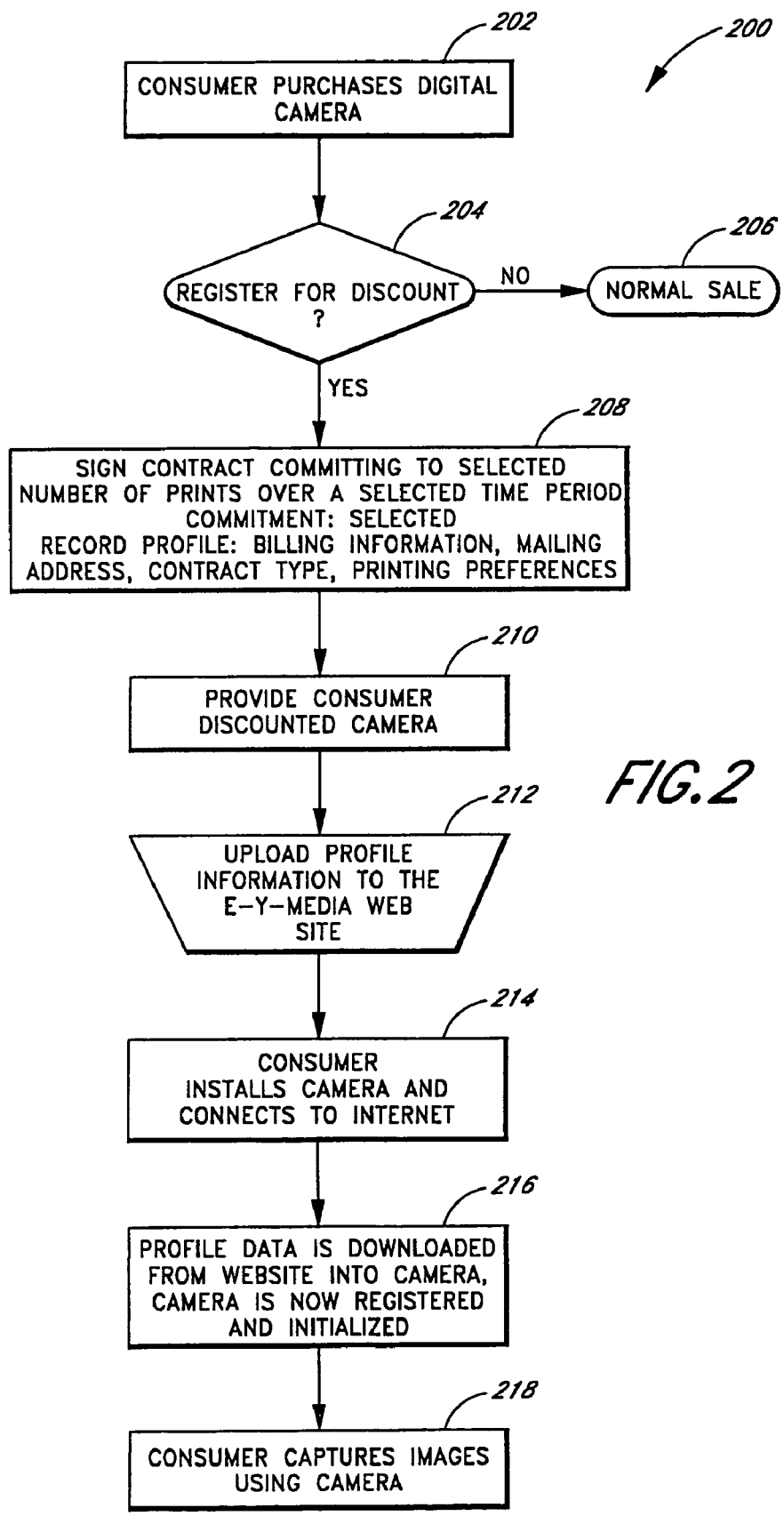
FIG. 2 illustrates an exemplary method of registering to receive a camera.

FIG. 2 illustrates an exemplary process 200 of registering to receive a camera. At state 202 a consumer initiates the purchase of a camera. At state 204, the consumer may be offered the choice of a conventional straight purchase or a free or discounted camera in exchange for a commitment or contract to purchase or have purchased a selected number of image reproductions. If the consumer elects to make a conventional purchase, the process 200 proceeds to state 206, where the sale process is completed.

If, instead, the consumer elects to contract to purchase or have purchased a selected number of image reproductions or otherwise expend an agreed to amount of money with the camera provider or an associated entity thereof, the process 200 proceeds to state 208. At state 208, the consumer enters into a contract with the camera provider or other designated entity. The contract includes a commitment by the consumer that a certain number of prints, print equivalents (useful items, like mugs, bearing image reproductions), and/or expend a certain amount of money on goods and services over a selected time period.

The consumer typically provides certain profile information, such as billing information (such as billing address and credit card number), mailing address, e-mail address, the contract type(purchase, lease-type, etc.), printing preferences (such as whether prints are to be hard copies, stored on digital media, e-mailed, and so on, and the print size and finish), password and the like. FIGS. 7A–B illustrate an exemplary registration form in which the consumer enters profile information, such as user name, password, address, other contact information, billing information, and shipping information. The consumer may select the default number of copies to be made of each image, the print sizes, if any, and whether copies of the images should be provided on CD-ROM. Optionally, the form may also include fields allowing the consumer to specify that copies of prints should automatically be made for a designated recipient and the method of delivery to the recipient (such as hard copy, optical disk, and/or e-mail).

Once the consumer submits the application form, selected information, such as credit information and mailing address, may be optionally verified. The camera provider then supplies the consumer the camera at state 210 and charges the consumer the agreed upon discounted price for the camera, unless, of course there is a 100% discount, i.e., the camera is free. The camera provider also generates a unique user identification code, which is stored as part of the consumer profile. At state 212, the profile information is transferred to the server associated with the appropriate Web site which will be used to handle future orders for prints and related services and products. For ease of reference, and not by way of limitation, this web site is referred to as the "order placement" web site.

At state 214, the consumer installs (clarify #) the camera and connects the camera to the order placement Web site. At state 216, all or selected portions of the profile data is downloaded from the Web site server to the camera. In addition, a camera enabling code and a public key used for encrypting images are downloaded as well, thereby initializing the camera and completing the registration. At state 215, the consumer may begin using the camera to take photographs.

Figure 3:
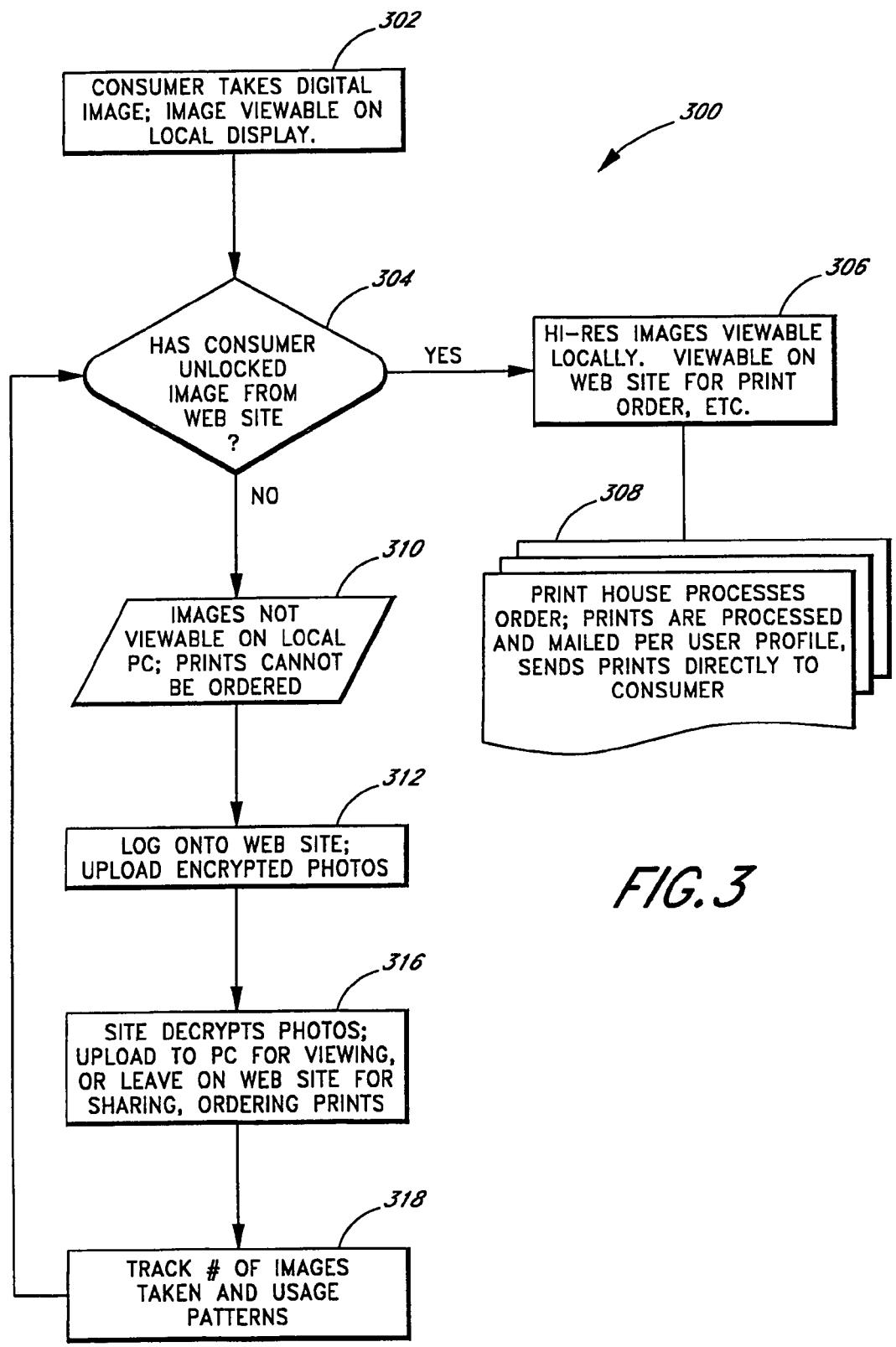
FIG. 3 illustrates an exemplary method of transferring and viewing images and providing image reproductions.

FIG. 3 illustrates an exemplary process 300 of transferring and viewing images and providing image reproductions. At state 302, the consumer takes photographs using a digital camera, and the images locked, via an encryption key or the like. The consumer may view the images on a local display, such as the camera LCD viewfinder. At state 304, if the consumer or other user attempts to transfer the images, such as to a computer, printer, or network, a determination is made as to whether the images have been unlocked using the appropriate code, such an authorization code or encryption key. If the images have not been unlocked, then at state 310, the images may not be viewed off of the camera and cannot be printed. For example, the locked images may not be viewable on a personal computer. Similarly, the images cannot be printed either on a local printer, or by a print house that does not have the appropriate key. In one embodiment, thumbnail, low-resolution images may optionally be allowed to be transferred viewed, and printed.

At state 312, the consumer logs onto the order placement Web site and uploads the encrypted images. At state 314, usage information, including the number of images taken and transferred and at what resolution, is tracked and stored. In addition, if the images are associated with caption information, such as "holiday," "birthday," and/or "anniversary", the caption information may be stored. This information may be used to further build the consumer's profile for targeted advertising purposes or to provide special offers. For example, if an order is placed for several pictures captioned or titled "Anniversary," special related offers, such as for a bound photo album including the appropriately captioned pictures, with the phrase "Our anniversary" engraved on the cover, or discounted enlargements or frames, may be presented.

At state 316, the images are decrypted. The decrypted images may be transferred or uploaded to the consumer's computer for viewing and printing on a local printer, and/or may be posted on a Web page associated with the order placement Web site so that the consumer or others may order image reproductions. In one embodiment, the consumer may be required to order reproduction of at least one of the uploaded images, or place some other type of eligible order, before the images are viewable. The number of images taken and other usage information is tracked at state 318. The process then returns to state 304.

If, at state 304, it is determined that the images are unlocked, the process proceeds to state 306. The images are viewable on a local terminal, such as a personal computer and/or may be viewed on a Web page. At state 308, the orders are received and processed. In one embodiment, a print house that makes the image reproductions processes the orders. The image reproductions are sent to the consumer and others as specified in the consumer profile or as otherwise directed. Thus, the image reproductions may be sent by mail, e-mail, fax, and so on. The image reproductions may be sent directly to the consumer by the print house, without having to first send the reproductions to the order taker.

Figure 4:
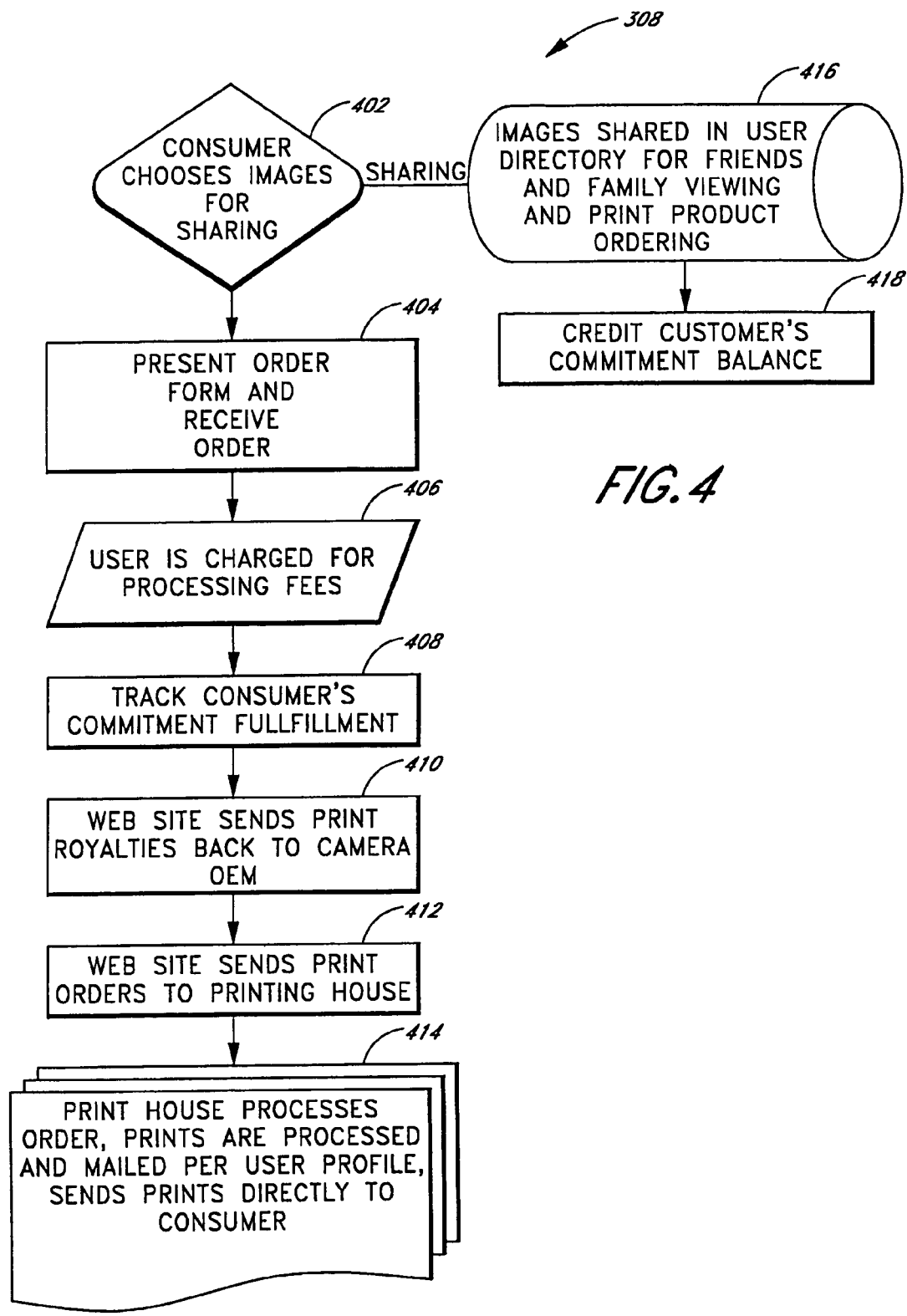
FIG. 4 illustrates in greater detail the order processing activity illustrated in FIG. 3.

FIG. 4 illustrates state 308 of FIG. 3 in greater detail. At state 402, the consumer selects which images are to be private, which are to be shared, and which are to be public. For orders placed by the consumer, the process proceeds to state 404. The consumer is presented with an order form that displays the consumer's default order information stored in the consumer profile. Thus, for example, the order form specifies how many copies of each image reproduction should be made, the type of image reproduction, if the image reproduction is a paper print, the paper and finish type, the size of the print, the mailing address, billing information, and other recipients who are to receive reproductions of the images, paid for by the consumer. The consumer can optionally modify the presented information as needed or desired. Further, the consumer can specify that only certain images are to be reproduced, and can specify the type and size of image reproductions on an image-by-image basis. Once the consumer completes the order form, the consumer submits the order for processing.

At state 406 the consumer is charged or debited for the order. The form of the charge or the debit of course depends on the financial instrument (credit card, debit card, pre-paid account, etc.) selected to pay for the order. At state 408, the consumer's commitment to order a certain number of prints or to spend a certain amount of money is tracked. The outstanding commitment balance is reduced by an amount related to the size and type of order placed at state 404.

If the camera manufacturer or OEM (original equipment manufacturer) has elected to participate in the image processing profits, in exchange, by way of example, for a reduction in the camera cost to the camera provider, then a portion of the order proceeds charged at state 406 are transferred to the camera OEM at state 410.

If the-order processing Web site is not managed directly by the print house, then, at state 412, the consumer's order is transferred to the print house. In one embodiment, the consumer may select the print house. Further, different portions of the order may be sent to different print houses.

For example, orders for mugs with the consumer's images printed thereon may be sent to a different print house then orders for paper prints. At state 414, the print house processes the order, and mails the prints to the consumer based on either information provided in the consumer profile or otherwise specified by the consumer.

At state 416, designated users, such as family members, friends, business entities, or the like, may view shared images via a Web page or directory associated with the consumer. As allowed by the consumer, these designated users may order image reproductions. At state 418, the consumer may receive credit towards the consumer's commitment based on the orders placed by others. In one embodiment, the consumer may receive a royalty for each reproduction ordered by others. Optionally, the royalty may be paid only if the consumer has already fulfilled the consumer's commitment.

Figure 5:
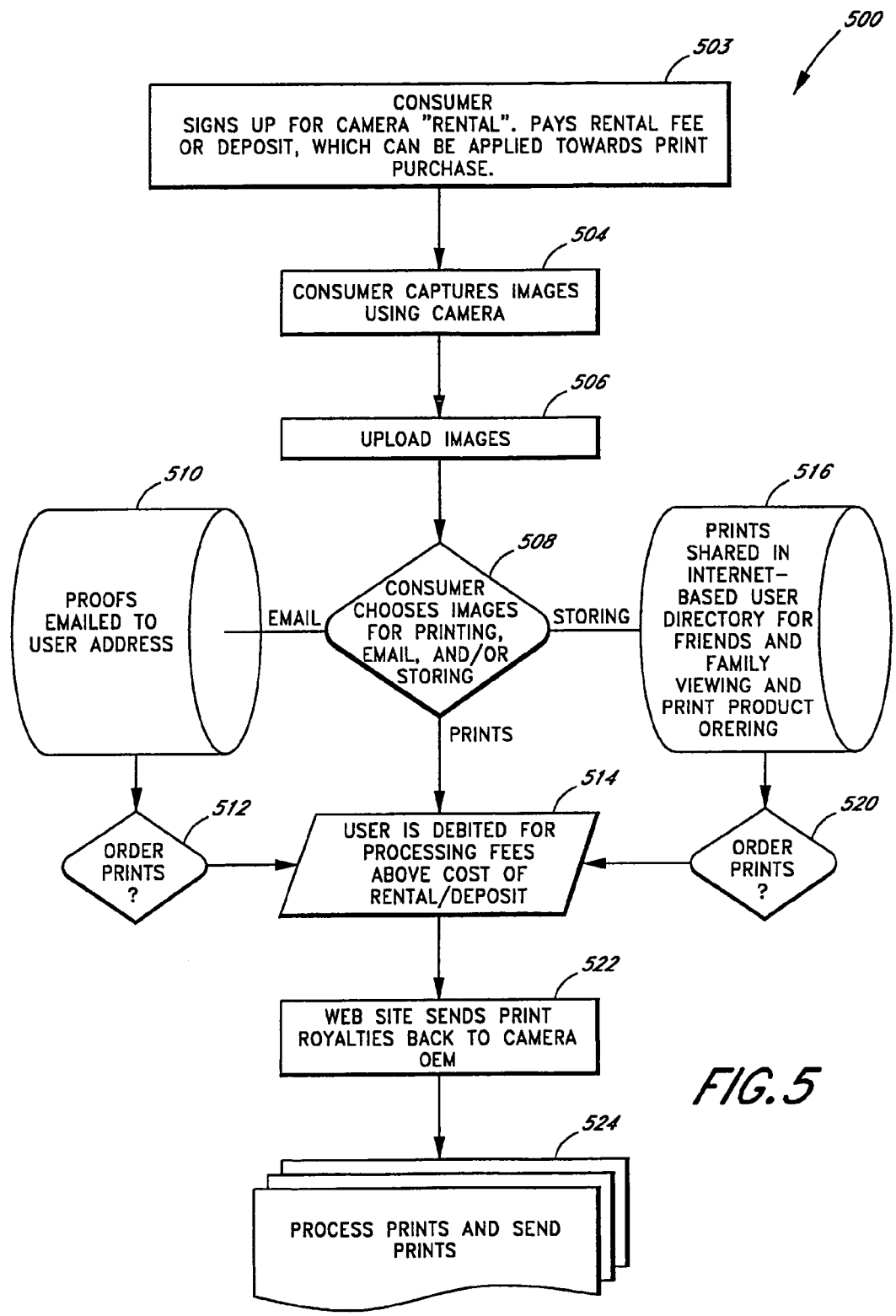
FIG. 5 illustrates an exemplary method of renting a camera.

FIG. 5 illustrates an exemplary process 500 of renting a camera. At state 502, the consumer visits a rental station or kiosk, which may be an automatically operated kiosk or may be staffed by operators. Such a kiosk may be strategically located at transport centers, such as an airport, bus station, railway terminal, or at other locations likely to be visited by picture takers or tourists, such as hotels, amusement parks, national parks, landmarks, sports stadiums, beaches, scenic areas, restaurants, and the like. The consumer provides a rental fee or deposit, in the way of a credit card charge, an account debit, cash, etc. The consumer is notified that all or a portion of the rental fee or deposit may be applied towards the purchase of image reproductions for images taken with the camera, or for the purchase of other goods or services associated with the camera renter.

At state 504 the consumer takes photographs using the camera. At state 506, the consumer uploads the images to a computer system. The upload may be performed at the kiosk from which the camera was rented or via other connections, such as a wireless network or another computer. The computer system to which the images are to be uploaded may be located within the kiosk or the computer system may be remotely located. At state 508, the consumer selects images to be stored or to be reproduced via printing, e-mail or the like. The consumer may enter several e-mail addresses and have copies of the images mailed to all designated addresses. The selection may be performed via a kiosk display or other terminal. At state 510 the images which the consumer requested to be e-mailed are now e-mailed. The e-mail address to which the e-mail is directed may belong to the consumer or to anyone whose e-mail address the consumer entered at state 508. At state 516, the stored images may be viewed via the Internet or the like by specified users or by the public at large, as designated by the renter.

At state 512, orders are received for image reproductions from the e-mail recipients. At state 520, orders are received for image reproductions from users who viewed the images at state 516. At state 514, the user that placed the order is charged for the cost of the reproductions. In one embodiment, all or part of the camera rental cost may be applied to the charge, so that only the amount above that rental cost is actually charged. Optionally, only the renter receives credit towards the order for the rental fee.

If a camera OEM is participating in the process, for example, by providing the camera to the kiosk operator at a discount, then at state 522 a portion of the fees collected via the camera rental and/or via orders for reproductions are forwarded to the camera OEM. At state 524 the reproductions, in the form of prints and the like, are sent to those who ordered the reproductions.

Figure 6:
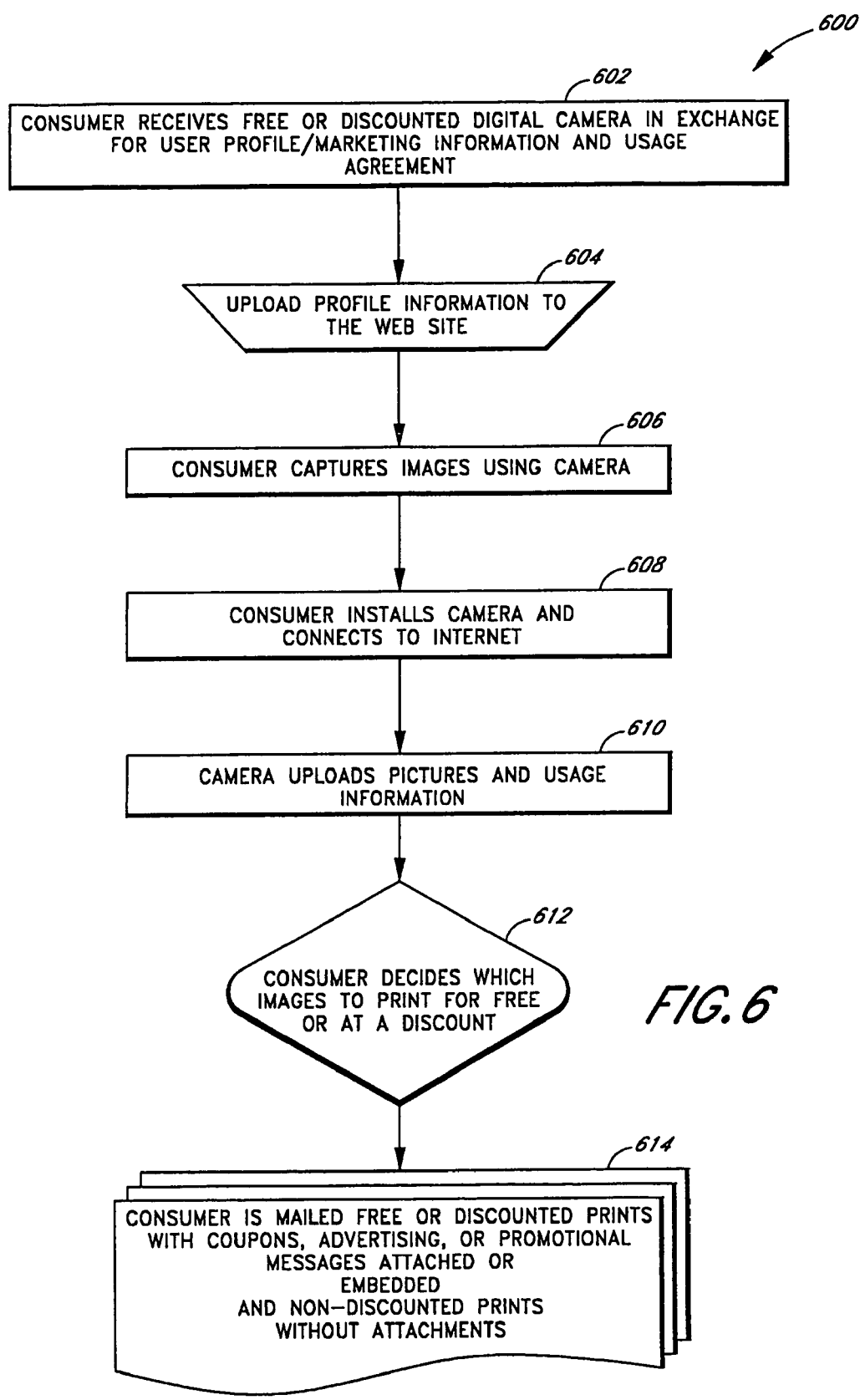
FIG. 6 illustrates an exemplary method of providing advertising and coupons.

FIG. 6 illustrates an exemplary method 600 of providing advertising and coupons. At state 602, the consumer receives a free or discounted camera in exchange for providing consumer profile information and also optionally for committing to use the camera and order a certain number of prints or other image reproductions. The consumer profile information may include information useful to marketers, such as, by way of example consumer age, income, net worth, number and types of cars, value of home, equity in home, number and type of computers, family size, address or zip code, number of business and personal trips per year, and so on.

At state 604, the profile information is transferred to a Web site associated with the camera provider. The consumer then may capture images using the camera at state 606. The images may be viewed on a local camera display, but, in one embodiment, are encrypted so that they may not be viewed by the consumer or an external display and may not be printed out at full resolution or at all. At state 608, the consumer connects the camera to the Web site via the Internet. As previously discussed, the connection may be made directly from the camera or via a personal computer or the like. The consumer then logs in. Once the log-in is complete, at state 610 the camera uploads the images and usage information to the Web site, which decrypts the images.

At state 612, the consumer may view the decrypted images on a terminal or the like. The consumer may then order reprints of the images. Advantageously, the consumer may elect to receive reprints of selected images with attachments, such as advertisements, coupons, promotional messages, or the like attached, in exchange for receiving the reprints for free or at a discount. A further advantage of this method is that the advertisements, coupons, promotional messages, and the like may be targeted based on the consumer's profile information gathered at state 602. In one embodiment, the consumer may also elect to purchase reprints of the images without advertisements, coupons, or promotional messages at an increased cost to the consumer as compared to reprints ordered with such attachments. At state 614, the consumer is provided with the free or discounted prints with the attachments and the ordered images without the attachments.

Figure 8:
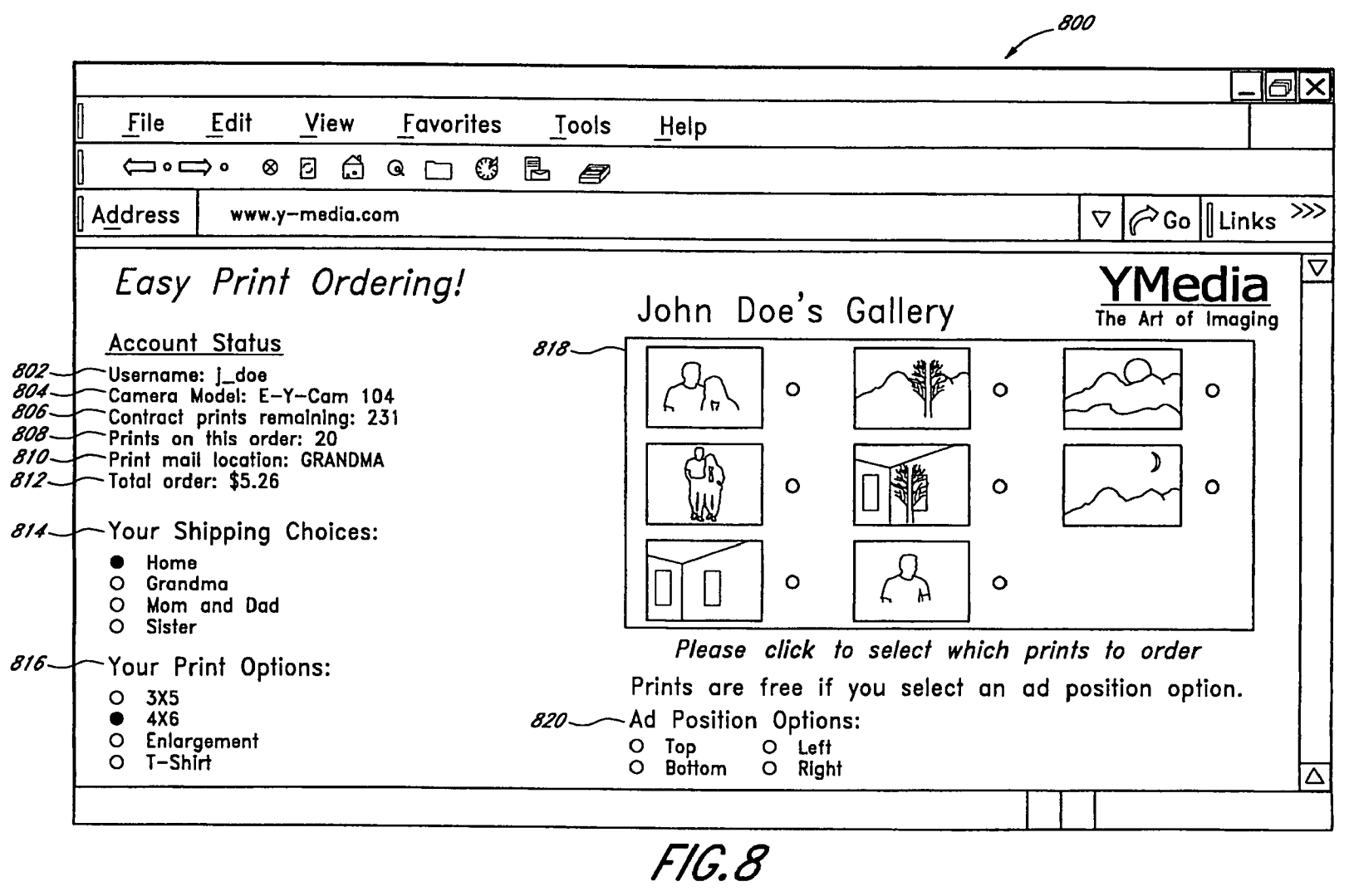

FIG. 8 illustrates an exemplary Web pale 800 used to view account status and to order prints. The user's images, uploaded from the user's camera, are displayed as part of the user's on-line gallery 818. The user can select which images are to be reproduced by activating the filed or check box associated with the print.

The account status information includes the user name 802, the camera model provided to the user 804, the number of prints that the user still needs to order to fulfill the user's contract commitment 806, the number of prints currently being ordered 808, the default recipients) of the prints 810, and the total cost of the order 812. The information provided in fields 806, 808, and 812 may be updated in real-time to reflect additions or deletions to the current order.

The user may elect to have additional copies of the images shipped to recipients (other than the default recipients) via a shipping choice menu 814. For example the user may elect to have copies sent to the user's home, a grandmother, parent, or a sibling. The user can also select various print options via a print options menu 816. For example, the user can select the print size, enlargements, and/or to have the image printed on an item, such as a T-shirt, cup, or calendar. If the user has previously selected a default print option via the registration form or via a preference form, the print option corresponding to the default will already be automatically selected when the form is presented to the user. The user can de-select the default option my clicking on the appropriate option.

The exemplary form illustrated in FIG. 8 also allows the user to elect to include advertisements printed or emblazoned on prints over the print image in exchange for receiving the prints for free. The user can advantageously select the position of the advertisement on the print. For example, the user can select to have the advertisement printed on the top, bottom, left side or right side of the print via an advertisement position menu 820. In addition advertisements may be presented directly on the Web page 800.

Figure 9:
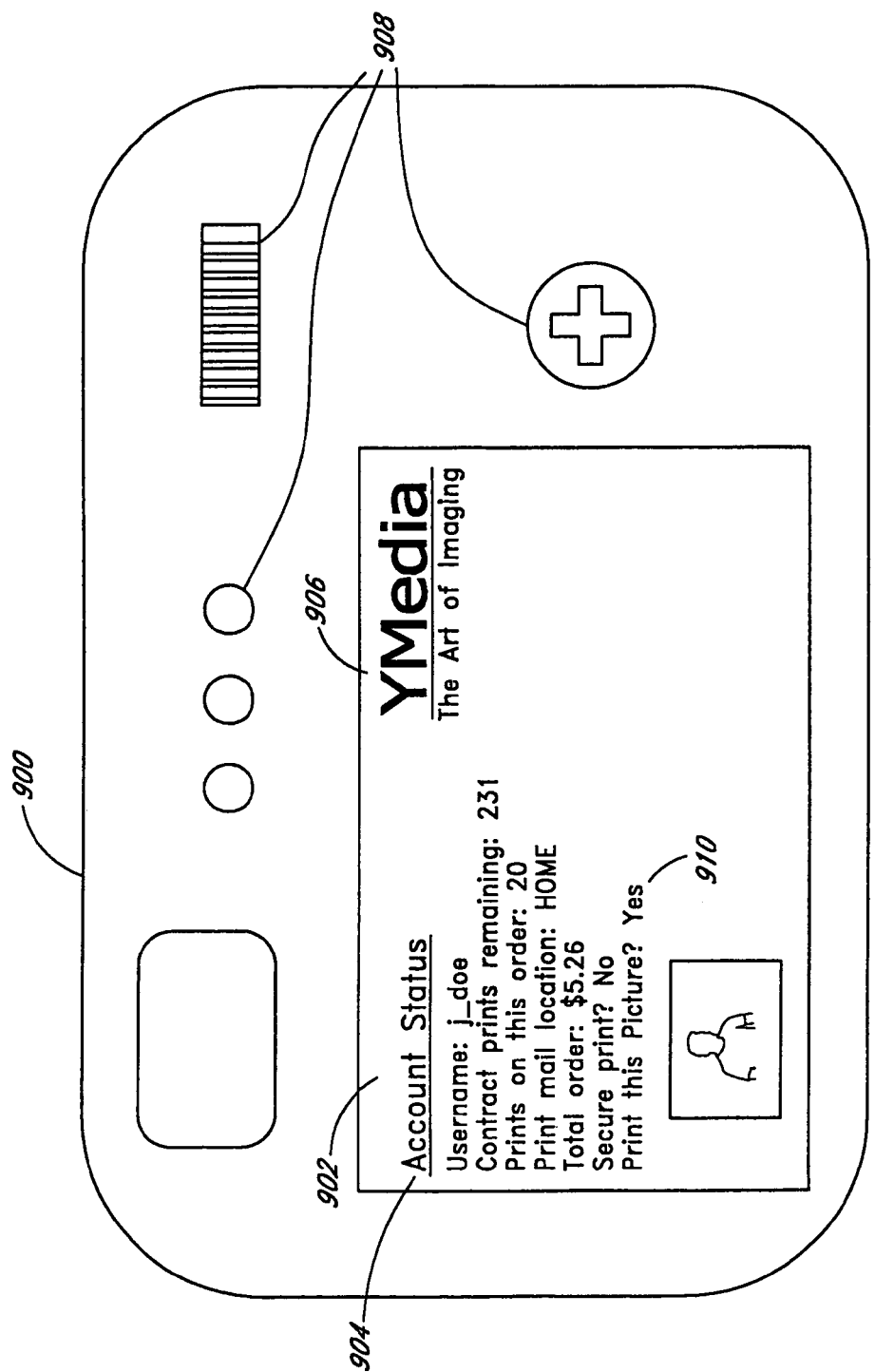
FIG. 9 illustrates an exemplary viewfinder display, including an image, account status and order information.

As previously discussed, in one embodiment, a camera equipped with an appropriate network interface and user interface controls 908 can be used to directly provide orders. FIG. 9 illustrates an exemplary flat panel viewfinder display, displaying an image, account status and order information. Account status 902, including information previously downloaded from the camera provider Web site and information based on the current order being placed, is provided. The user can elect to secure the image being displayed so that it may not be publicly viewed once the image is uploaded to the Web site. The user can also order prints of the image. The user may toggle between "yes" and "no" entries by moving a cursor 910 to the entry using a built in toggle mouse, touch pad, or the like, and then activating an appropriate button. Of course other user input devices, such as voice recognition or a touch screen may be used as well. Advertisements 906 may also be displayed on the camera viewfinder.

Figure 10:
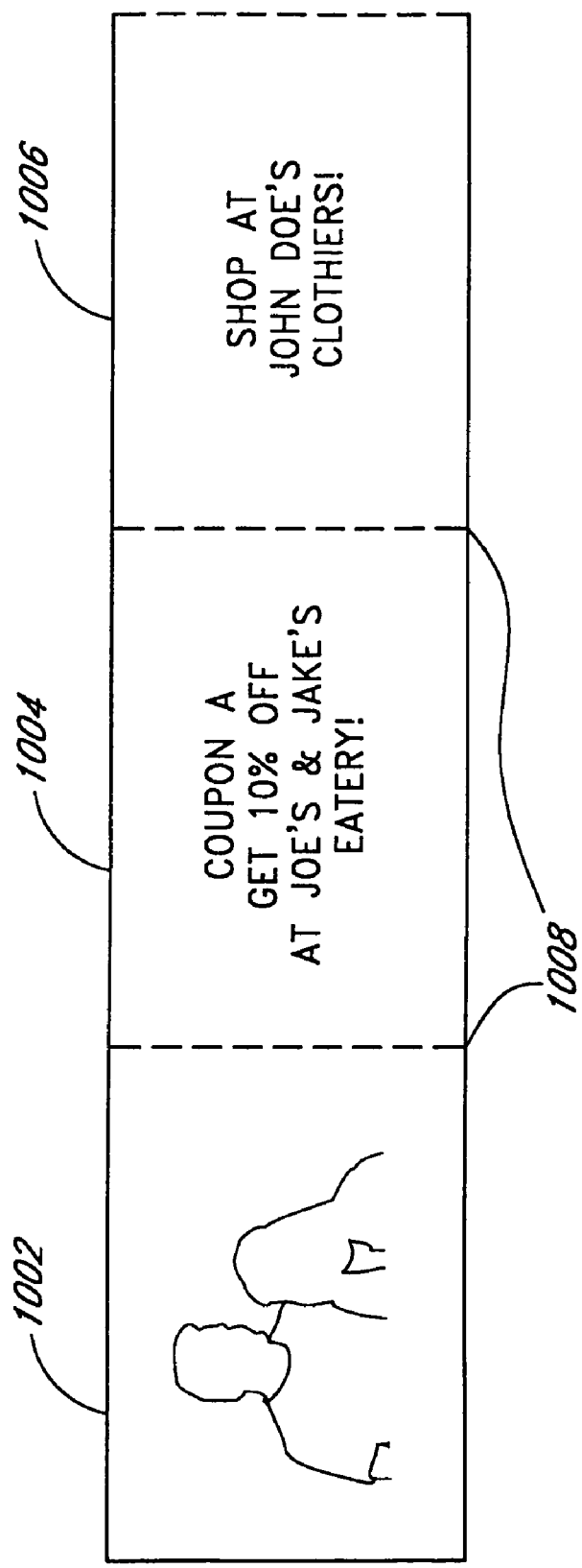
FIG. 10 illustrates au exemplary print with an attached coupon and an attached advertisement.
Figure 11:
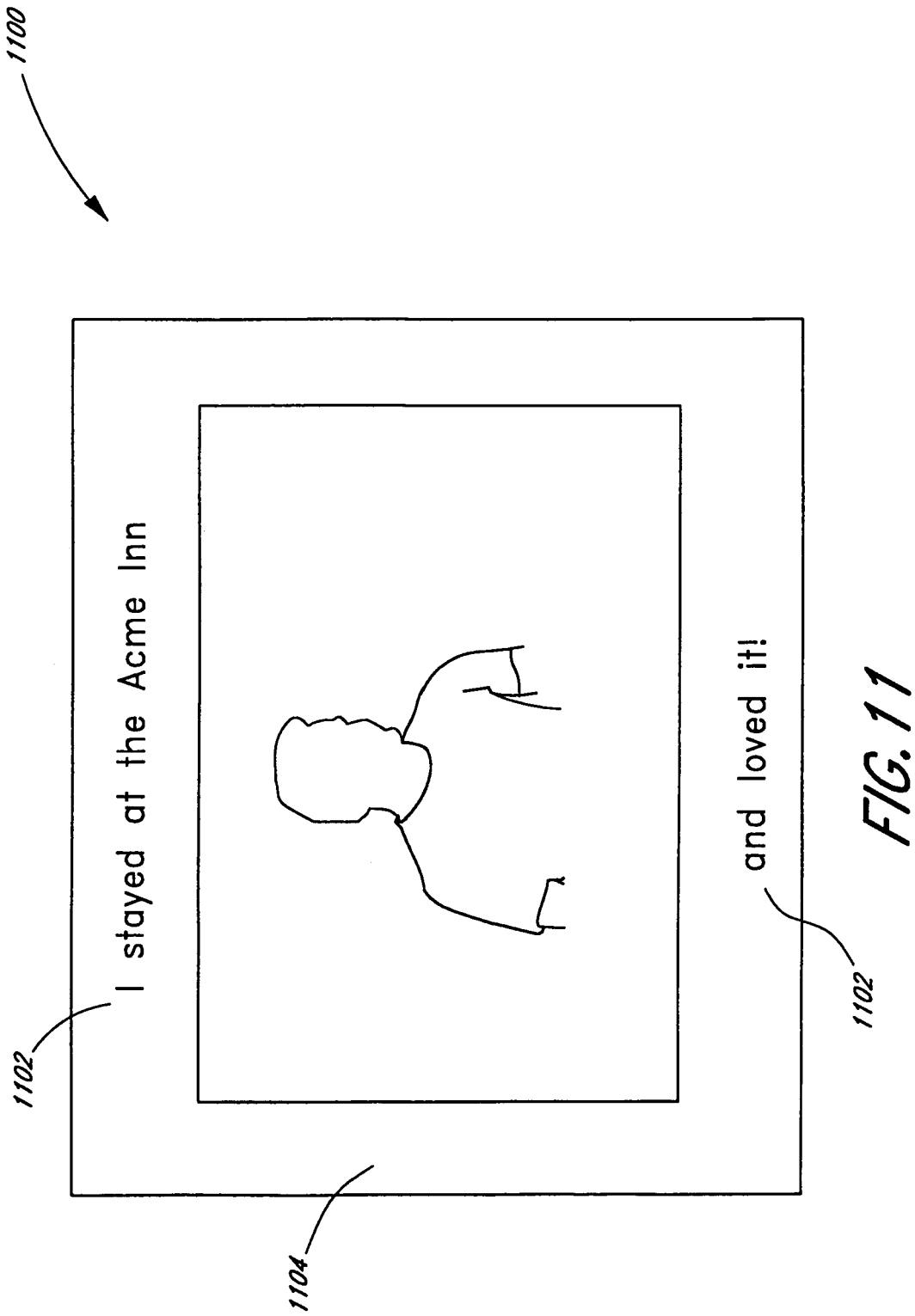
FIG. 11 illustrates an exemplary print with advertising in a border area.

FIG. 10 illustrates an exemplary print 1002 with an attached coupon 1004 and an attached advertisement 106. The advertisement and coupon may be selected by the print house or camera provider based upon the user profile. For example, a coupon may be provided for a restaurant located near the user's home or business address. Similarly, an advertisement for a clothing establishment may be selected based on the user's home or business address and the user's income level. The coupon and advertisement attachment points 1008 may be perforated to make it easy to tear the coupon and advertisement off, so that they may be used, saved or discarded. FIG. 11 illustrates an exemplary print with advertising 1102 in a border area 1104. This ensures that the advertising does not obscure the image.

Figure 12:
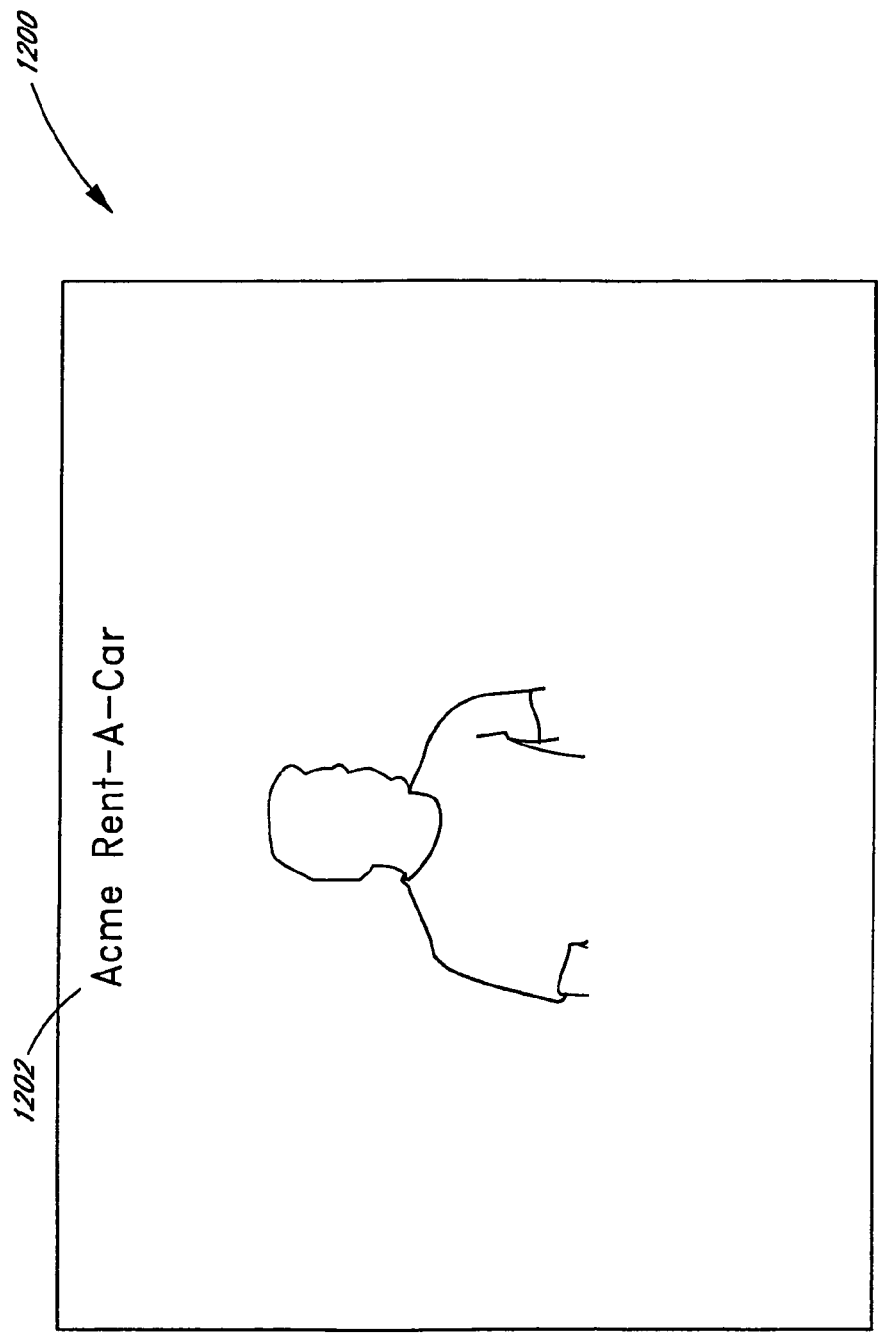
FIG. 12 illustrates an exemplary image with an advertisement emblazoned thereon.

FIG. 12 illustrates an exemplary image with an advertisement emblazoned thereon. This gives great prominence to the advertisement and makes it difficult to remove the advertisement, ensuring the advertiser received an adequate presence on the print.

Thus, as described above, the present invention advantageously enables consumers to obtain cameras with cameras with reduced or no up-front costs, print houses can depend on a steady revenue stream from picture orders that the consumer has committed to, and camera manufactures can participate in the downstream revenue associated with image processing.

Although this invention has been described in terms of certain preferred embodiments, other embodiments that are apparent to those of ordinary skill in the art are also within the scope of this invention. Accordingly, the scope of the present invention is intended to be defined only by reference to the appended claims.

What is claimed is:

1. A method for providing cameras to consumers in exchange for a commitment, the method comprising the steps of:

providing an electronic network through which a camera provider electronically communicates with a consumer to generate a contract, said contract comprising the terms for:

offering by said camera provider to provide said camera for a commitment by the consumer to purchase at least a first amount of image reproductions from a specified image processor within a selected amount of time, and committing by said consumer to purchase at least the first amount of image reproductions from said image processor within the selected amount of time;

determining via said electronic network that the consumer has at least one of a plurality of financial instruments;

providing the consumer with the camera, in response to the consumer entering into the commitment and determining via said electronic network that said consumer has at least one of the plurality financial instruments;

connecting said camera to electronically communicate via said electronic network to said image processor and transferring images acquired by said camera to said image processor; and printing reproductions of at least one of the images having access restricted to said image processor.

2. The method as defined in claim 1, further comprising the step of connecting said camera to electronically communicate via said electronic network for granting access to low resolution versions of images taken with the camera to be transferred from the camera.

3. The method as defined in claim 1, further comprising the steps of:

connecting someone other than the consumer to communicate via said electronic network;

receiving an order via said electronic network under said contract for at least one image print from someone other than the consumer; and crediting under said contract the consumer's commitment fulfillment based on said order.

4. The method as defined in claim 1, further comprising the steps of:

connecting someone other than the consumer to communicate via said electronic network;

receiving an order via said electronic network under said contract for an image reproduction from someone other than the consumer; and providing under said contract the consumer with a benefit based on said order.

5. The method as defined in claim 1, wherein at least one image is received from a terminal connected to communicate via said electronic network to which at least one of said images has been transferred from the camera.

6. The method as defined in claim 1, wherein access to said images taken by the camera is restricted by the camera until the consumer has fulfilled the commitment and an unlocking code has been received via said electronic network by the camera.

7. The method as defined in claim 1, further comprising the step of connecting said camera to electronically communicate via said electronic network for restricting access by said consumer to images acquired by the camera and retained within said camera to prevent the consumer from obtaining reproductions of the images made from a source not associated with the camera provider.

8. The method as defined in claim 7, further comprising the step of connecting said camera to electronically communicate via said electronic network for granting access to images taken with the camera to be displayed on a camera display.

9. The method as defined in claim 7, wherein the step of restricting access to said images comprises the step of encrypting by the camera of at least a first image captured by said camera to prevent the user from having prints of at least the first image from a source not associated with a provider of said camera.

10. The method as defined in claim 1, wherein the camera is provided, at least partly, in response to an amount paid by the consumer for the camera, wherein the amount is related to the number of reproductions the consumer has committed to purchase under said contract.

11. The method as defined in claim 1, further comprising the step of transferring camera usage information to a user information database connected to said electronic network, whereby said camera usage information includes:
 average number of pictures captured before upload of pictures;
 average number of pictures captured vs. number of pictures printed;
 time of day or year when camera is most likely to be used and frequency of flash usage;
 amount of time spent viewing each image on the LCD viewfinder;
 amount of time spent editing each image on-camera;
 number of images captured over a given time period;
 typical or average preferences for print numbers, sizes, and other products ordered;
 track which advertisements/promotions the user investigated or generated a "click-through" experience;
 track how many different locations to which the user had prints shipped;
 track the user classification of a photo gallery.

12. The method as defined in claim 11, further comprising the step of selecting advertising to be presented to the user based at least in part on the camera usage information.

13. The method as defined in claim 11, further comprising the step of modifying camera performance based at least in part on the camera usage information.

14. The method as defined in claim 1, wherein the type of camera provided is based, at least in part, on the extent of the commitment.

15. The method as defined in claim 1, wherein the first amount is a dollar amount.

16. The method as defined in claim 1, wherein the first amount is a quantity of image reproductions.

17. The method as defined in claim 1, further comprising the steps of:
 receiving user profile information via said electronic network; and
 storing at least a portion of the user profile information in the camera.

18. The method as defined in claim 1, wherein the commitment is to be fulfilled within a predetermined amount of time.

19. The method as defined in claim 18, further comprising the step of fixing the price to the user of at least a first type of image reproduction provided under said contract for at least the predetermined amount of time.

20. The method as defined in claim 1, further comprising the step of receiving an order for hard copy image reproductions, where the user places the order using a camera user interface connected to communicate via said electronic network.

21. The method as defined in claim 1, further comprising the step of downloading via said electronic network an advertisement into the camera and displaying the advertisement on a camera display.

22. The method as defined in claim 1, further comprising the step of receiving a designation from the user as to which print house is to print images ordered by the user.

23. The method as defined in claim 1, wherein the camera is provided by a print house.

24. The method as defined in claim 1, wherein the camera is provided by a camera manufacturer to an intermediary at a discount, who then provides the camera to the user, and the intermediary causes the camera manufacturer to be paid an amount based at least in part on user orders for image reproductions.

25. The method as defined in claim 1, wherein the camera is provided with no initial cost or charge to the user.

26. The method as defined in claim 1, wherein the camera is provided at a reduced cost to the user in exchange for the commitment.

27. The method as defined in claim 1 wherein providing said camera comprises the steps of:
 offering to rent said camera to consumer in exchange for a first fee; and
 offering to reduce said first fee for said camera for a commitment to purchase at least a first amount of reproductions of images from said camera.

28. The method as defined in claim 27, wherein the camera is rented at an automated kiosk.

29. The method as defined in claim 27, wherein the consumer is charged an additional fee if the camera is not returned within a predetermined amount of time.

30. The method as defined in claim 1 wherein the camera provider is a camera distributor.

31. The method as defined in claim 30, where the camera manufacturer provides the camera at a discount in return for a commitment on the part of the distributor that the camera manufacturer will be paid at least said first amount.

32. The method as defined in claim 1 wherein providing said camera comprises the steps of:
 offering to lease said camera for a predetermined period wherein said lease includes providing said consumer with a first number of prints at no additional cost as part of the lease, and
 receiving a commitment electronic network by said consumer to lease the camera for the predetermined period;
 providing said consumer with the first number of prints at no additional cost as part of the lease; and
 providing additional prints beyond the first number of prints for no more than a predetermined fee.

33. The method as defined in claim 1 further comprising the steps of:
 transferring personal information via electronic network from said consumer to said camera provider; and
 retaining said personal information within a consumer database.

34. The method as defined in claim 33 wherein said personal information comprises
 consumer name;
 consumer identification code;
 mailing address;
 billing address;
 e-mail address;
 other contact information such as phone numbers and fax numbers;
 billing information, including credit card information;
 preferred print image provider;

reprint/enlargement size preference;
reprint/enlargement size preference;
finish preference;
camera brand, type, and specifications;
internet service type and connection speed;
contract data: picture development and reproduction counters, number of prints remaining to meet contract commitment;
security settings, unlocking keys, activation code; and
usage pattern information.

35. The method as defined in claim 34 further comprising the step of providing advertising to said consumer through said camera transferred over said electronic network when said camera is connected to communicate via said electronic network based on said personal information.

36. The method as defined in claim 34 further comprising the step of providing coupons to said consumer based on said personal information.

37. A camera distribution system for providing cameras to consumers in exchange for a commitment comprising:
   a camera providing entity for supplying at least one of said cameras for a commitment by the consumer to purchase at least a first amount of image reproductions within a selected amount of time from a specified image processor;
   a camera distributed by said camera providing entity to said consumer said camera programmed to restricted access;
   an electronic network that allows electronic communication between said camera providing entity and said consumer wherein said consumer commits via said electronic network to purchase of at least the first amount of image reproductions within the selected amount of time and the camera providing entity supplies the consumer with at least one of said cameras, in response to the consumer entering into said commitment via said electronic network;
   said specified image processor for communication with said consumer via said electronic network to receive images acquired by said camera and provide said image reproductions based on said commitment; and
   an image printing device having access restricted to said specified image processor for reproduction of at least a first image from said camera.

38. The camera distribution system as defined in claim 37, wherein images taken with the camera are permitted to be displayed on a camera display.

39. The camera distribution system as defined in claim 37 further comprising:
   a consumer database in communication with the camera providing entity retaining personal information transferred from said consumer to said camera providing entity.

40. The camera distribution system as defined in claim 39 wherein said personal information comprises:
   consumer name;
   consumer identification code;
   mailing address;
   billing address;
   e-mail address;
   other contact information such as phone numbers and fax numbers;
   billing information, including credit card information;
   preferred print image provider;
   reprint/enlargement size preference;
   reprint/enlargement size preference;
   finish preference;
   camera brand, type, and specifications;
   internet service type and connection speed;
   contract data: picture development and reproduction counters, number of prints remaining to meet contract commitment;
   security settings, unlocking keys, activation code; and
   usage pattern information.

41. The camera distribution system as defined in claim 39 further comprising an advertising provider in communication via said electronic network with the consumer database and image processor to associate advertising information with said image reproductions based on said personal information in return for credit toward said commitment for image reproductions.

42. The camera distribution system as defined in claim 41 wherein the advertising provider imparts coupons to said consumer based on said personal information.

43. The camera distribution system as defined in claim 37, wherein said camera is connected to communicate via said electronic network to grant permission for low resolution versions of images taken with the camera to be transferred from the camera.

44. The camera distribution system as defined in claim 37, wherein the image processor receives an order for an image print from someone other than the consumer; and said image processor credits the consumer's commitment fulfillment based on the order.

45. The camera distribution system as defined in claim 37, wherein the image processor receives an order for an image reproduction from someone other than the consumer; and said image processor provides the consumer a benefit based on the order.

46. The camera distribution system as defined in claim 37, wherein said images are secured within said camera such that at least said first image may only be transferred to said image processor and said secured first image is received from a terminal connected to communicate via said electronic network to which said secured first image is transferred from the camera.

47. The camera distribution system as defined in claim 37, wherein images taken by the camera are secured by the camera until the consumer has fulfilled the commitment and an unlocking code has been received by the camera when said camera is connected to communicate via said electronic network.

48. The camera distribution system as defined in claim 37, wherein the image processor receives via said electronic network in association with the first secured image at least one of ISO equivalency information, aperture setting information, and shutter speed information.

49. The camera distribution system as defined in claim 37, wherein the camera provided is at least partly in response to an amount paid by the consumer for the camera, wherein the amount is related to the number of reproductions the consumer committed to purchase.

50. The camera distribution system as defined in claim 37 further comprising an image securing device associated with said camera to prevent reproduction of at least a first image acquired from the camera by a source not associated with the camera providing entity, wherein the image securing devise encrypts said first image within said camera upon receipt of an encryption key from said camera providing entity via said electronic network.

51. The camera distribution system as defined in claim 37 wherein the camera providing entity discounts the price of said camera for the commitment by said consumer to purchase at least the first amount of image reproductions.

52. The camera distribution system as defined in claim 37 wherein the camera providing entity leases said camera as a result of the commitment by said consumer to the purchase of at least the first amount of image reproductions.

53. The camera distribution system as defined in claim 37 wherein the camera providing entity offers said camera at no cost as a result of the commitment by said consumer to the purchase of at least the first amount of image reproductions.

54. The camera distribution system as defined in claim 37 wherein the camera providing entity and the image processor are associated with the camera manufacturer.

55. The camera distribution system as defined in claim 37 wherein the consumer reviews said images acquired by said camera and selects desired images acquired by said camera for transfer to said image processor for reproduction.

56. The camera distribution system as defined in claim 37 further comprising an image database associated with said image processor to receive and retain said images acquired by said camera and transferred to said image processor.

57. A computer readable medium retaining a computer code which, when executed on a computing system performs a program process for providing cameras to consumers in exchange for a commitment, said program process comprising the steps of:
providing an electronic network through which a camera provider and a consumer electronically communicates to generate a contract where said consumer acquires at least one camera in exchange for said commitment, wherein said contract comprises the terms for:
offering by said camera provider to provide said camera for a commitment by the consumer to purchase at least a first amount of image reproductions from a specified image processor within a selected amount of time, and
committing by said consumer to the purchase of at least the first amount of image reproductions from said image processor within the selected amount of time;
determining via said electronic network that the consumer has at least one of a plurality of financial instruments;
providing the consumer with the camera, in response to the consumer entering into said commitment and determining that the consumer has at least one of the plurality of financial instruments;
connecting said camera to electronically communicate via said electronic network with said image processor;
transferring images acquired by said camera to said image processor; and
printing reproductions of at least one of images having access restricted to said image processor.

58. The medium as defined in claim 57, wherein said program process further comprises allowing images taken with the camera to be displayed on a camera display.

59. The medium as defined in claim 57, wherein said program process further comprises allowing low resolution versions of images taken with the camera to be transferred from the camera.

60. The medium as defined in claim 57, wherein said program process further comprises:
connecting someone other than the consumer to said electronic network;
receiving an order via said electronic network for an image print from someone other than the consumer; and
crediting the consumer's commitment fulfillment based on the order.

61. The medium as defined in claim 57, wherein said program process further comprises:
connecting someone other than the consumer to communicate via said electronic network;
receiving an order via said electronic network for an image reproduction from someone other than the consumer; and
providing the consumer a benefit based on the order.

62. The medium as defined in claim 57, further comprising the step of connecting said camera to communicate via said network for restricting access to images acquired from the camera to prevent the consumer from obtaining reproductions of images made from a source not associated with the camera provider.

63. The medium as defined in claim 62 wherein the step of restricting access to said images comprises the step of encrypting at least said first image within said camera.

64. The medium as defined in claim 57, wherein images taken by the camera are secured by the camera until the consumer has fulfilled the commitment and an unlocking code has been received by the camera.

65. The medium as defined in claim 57, wherein said program process further comprises receiving, in association with the first secured image, at least one of ISO equivalency information, aperture setting information, and shutter speed information.

66. The medium as defined in claim 57, wherein the camera is provided, at least partly, in response to an amount paid by the consumer for the camera, wherein the amount is related to the number of reproductions the consumer committed to purchase.

67. The medium as defined in claim 57 wherein said program process further comprises the steps of:
transferring personal information via said electronic network from said consumer to said camera provider; and
retaining said personal information within a consumer database.

68. The medium as defined in claim 67 wherein said personal information is selected from the set of personal information consisting of:
consumer name;
consumer identification code;
mailing address;
billing address;
e-mail address;
other contact information such as phone numbers and fax numbers;
billing information, including credit card information;
preferred print image provider;
reprint/enlargement size preference;
finish preference;
camera brand, type, and specifications;
internet service type and connection speed;
contract data: picture development and reproduction counters, number of prints remaining to meet contract commitment;
security settings, unlocking keys, activation code; and
usage pattern information.

69. The medium as defined in claim 67 wherein said program process further comprises the step of providing coupons to said consumer based on said personal information.

70. The medium as defined in claim 67 wherein said program process further comprises the step of providing advertising to said consumer based on said personal information.

71. The medium as defined in claim 57 wherein the camera provider discounts the price of said camera for committing by said consumer to the purchase of at least the first amount of image reproductions.

72. The medium as defined in claim 57 wherein the camera provider leases said camera for committing by said consumer to the purchase of at least the first amount of image reproductions.

73. The medium as defined in claim 57 wherein the camera provider provides said camera at no cost for committing by said consumer to the purchase of at least the first amount of image reproductions.

74. The medium as defined in claim 57 wherein the camera provider and the image processor are associated with the camera manufacturer.

75. The medium as defined in claim 57 wherein said program process further comprises the step of:
   reviewing, by the consumer, of said images acquired by said camera; and
   selecting desired images acquired by said camera for reproduction.

76. The medium as defined in claim 75 wherein said images acquired by said camera are retained in an image database of said image processor.

* * * * *